United States Patent
Lainema et al.

(10) Patent No.: US 10,154,274 B2
(45) Date of Patent: Dec. 11, 2018

(54) APPARATUS, A METHOD AND A COMPUTER PROGRAM FOR VIDEO CODING AND DECODING

(71) Applicant: Nokia Technologies Oy, Espoo (FI)

(72) Inventors: Jani Lainema, Tampere (FI); Kemal Ugur, Tampere (FI); Miska Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 303 days.

(21) Appl. No.: 14/904,791

(22) PCT Filed: Jul. 16, 2014

(86) PCT No.: PCT/FI2014/050582
§ 371 (c)(1),
(2) Date: Jan. 13, 2016

(87) PCT Pub. No.: WO2015/011339
PCT Pub. Date: Jan. 29, 2015

(65) Prior Publication Data
US 2016/0165248 A1 Jun. 9, 2016

(30) Foreign Application Priority Data
Jul. 23, 2013 (GB) .................................. 1313113.1

(51) Int. Cl.
*H04N 19/44* (2014.01)
*H04N 19/70* (2014.01)
(Continued)

(52) U.S. Cl.
CPC ........... *H04N 19/44* (2014.11); *H04N 19/103* (2014.11); *H04N 19/107* (2014.11);
(Continued)

(58) Field of Classification Search
CPC .... H04N 19/44; H04N 19/107; H04N 19/167; H04N 19/70; H04N 19/91
See application file for complete search history.

(56) References Cited

U.S. PATENT DOCUMENTS 8,290,062 B1 10/2012 Chen
2007/0110154 A1 5/2007 Wang et al.
(Continued)

FOREIGN PATENT DOCUMENTS

CA 2917516 A1 1/2015
CN 1875636 A 12/2006
(Continued)

OTHER PUBLICATIONS

Office action received for corresponding Chinese Patent Application No. 201480049171.1, dated Jan. 10, 2018, 13 pages of office action and no page of Translation available.
(Continued)

*Primary Examiner* — Jonathan R Messmore
(74) *Attorney, Agent, or Firm* — Alston & Bird LLP

(57) ABSTRACT

A method for decoding an encoded video representation from a bitstream, the method comprising decoding an identifier indicating that all samples within a scope of the bitstream have been coded with a prediction restriction; determining that the scope covers a region of interest within a picture; decoding at least a first coding unit preceding said region of interest in decoding order in a parse mode such that syntax elements belonging to said at least first coding unit are parsed, but a sample reconstruction process of said syntax elements is omitted; and decoding at least a second coding unit belonging to said region of interest such that syntax elements belonging to said at least second coding unit are parsed and a sample reconstruction process is performed to said syntax elements.

19 Claims, 6 Drawing Sheets

US 10,154,274 B2
Page 2

(51) Int. Cl.

| | | |
|---|---|---|
| *H04N 19/103* | (2014.01) | |
| *H04N 19/17* | (2014.01) | |
| *H04N 19/107* | (2014.01) | |
| *H04N 19/167* | (2014.01) | |
| *H04N 19/91* | (2014.01) | |

(52) U.S. Cl.
CPC .......... *H04N 19/167* (2014.11); *H04N 19/17* (2014.11); *H04N 19/70* (2014.11); *H04N 19/91* (2014.11)

(56) References Cited

U.S. PATENT DOCUMENTS

| | | |
|---|---|---|
| 2007/0133675 A1 | 6/2007 | Honda et al. |
| 2009/0274214 A1 | 11/2009 | Yoon et al. |
| 2010/0118947 A1 | 5/2010 | Goetting |
| 2010/0232504 A1 | 9/2010 | Feng |
| 2010/0284460 A1 | 11/2010 | Tsai et al. |
| 2011/0096990 A1 | 4/2011 | Lu et al. |
| 2012/0163473 A1 | 6/2012 | Laroche et al. |
| 2012/0201306 A1 | 8/2012 | Kang et al. |
| 2013/0003827 A1 | 1/2013 | Misra et al. |
| 2014/0003504 A1 | 1/2014 | Ugur et al. |
| 2016/0173945 A1 | 6/2016 | Oh et al. |

FOREIGN PATENT DOCUMENTS

| | | |
|---|---|---|
| CN | 101262604 A | 9/2008 |
| CN | 101283599 A | 10/2008 |
| CN | 101313578 A | 11/2008 |
| CN | 101478671 A | 7/2009 |
| CN | 101742324 A | 6/2010 |
| CN | 102422640 A | 4/2012 |
| JP | H01103387 A | 4/1989 |
| JP | 2004-056616 A | 2/2004 |
| JP | 2005-142654 A | 6/2005 |
| JP | 2012-526489 A | 10/2012 |
| WO | 2003047266 | 6/2003 |
| WO | 2009119888 | 10/2009 |
| WO | 2010/129876 A1 | 11/2010 |
| WO | 2014/049205 A1 | 4/2014 |
| WO | 2014/106692 A1 | 7/2014 |
| WO | 2014/168972 A1 | 10/2014 |
| WO | 2015/004323 A1 | 1/2015 |
| WO | 2015/008986 A1 | 1/2015 |
| WO | 2015/140401 A1 | 9/2015 |

OTHER PUBLICATIONS

Office action received for corresponding Chinese Patent Application No. 201480052088.X, dated Jan. 31, 2018, 9 pages of office action and no page of Translation available.

Handley et al., "Session Descirption Protocol", RFC : 4566, Network Working Group, Jul. 2006, pp. 1-49.

"Advanced Video Coding for Generic Audiovisual services", Series H: Audiovisual and Multimedia Systems, Infrastructure of audiovisual services—Coding of moving Video, Recommendation ITU-T H.264, Feb. 2014, 790 pages.

Parameter Values for Ultra-High Definition Television Systems for Production and International Programme Exchange, Recommendation ITU-R BT.2020-1, Jun. 2014, 8 pages.

Parameter Values for the HDTV Standards for Production and International Programme Exchange, Recommendation ITU-R BT.709-6, Jun. 2015, 19 pages.

"Video Coding for Low Bit Rate Communication", Series H: Audiovisual and Multimedia Systems, Infrastructure of audiovisual services—Coding of moving Video, ITU-T Recommendation H.263, Jan. 2005, 226 pages.

"High Efficiency Video Coding", Series H: Audiovisual and Multimedia Systems, Infrastructure of audiovisual services—Coding of moving video, Recommendation ITU-T H.265, Oct. 2014, 540 pages.

Coban et al., "Support of independent sub-pictures", Joint Collaborative Team on Video Coding (JCT-VC) of ITU-T SG 16 WP 3 and ISO/IEC JTC 1/SC 29/WG 11, JCTVC-I0356, 9th Meeting, Qualcomm Incorporated, Apr. 27-May 7, 2012, pp. 1-5.

"Applications and Requirements for Scalable Video Coding", ISO/IEC JTC1/SC29/WG11/N5540, Requirements v.2, Mar. 2003, 14 pages.

"Information Technology—Coding of Audio-Visual Objects—Part 15: Advanced Video Coding (AVC) file format", ISO/IEC 14496-15, First edition, Apr. 15, 2004, 29 pages.

"Information Technology—Coding of Audio-Visual Objects—Part 14: MP4 File Format", ISO/IEC 14496-14, First edition, Nov. 15, 2003, 18 pages.

"3rd Generation Partnership Project;Technical Specification Group Services and System Aspects;Transparent end-to-end packet switched streaming service (PSS); 3GPP file format (3GP) (Release 12)", 3GPP TS 26.244, V12.0.0, Mar. 2013, pp. 1-61.

"Information Technology—Coding of Audio-Visual Objects—Part 12: ISO Base Media File Format", ISO/IEC 14496-12, Third edition, Oct. 15, 2008, 120 pages.

Search Report received for corresponding United Kingdom Patent Application No. 1312460.7, dated Jan. 30, 2014, 5 pages.

Segall et al., "Spatial Scalability Within the H.264/AVC Scalable Video Coding Extension", IEEE Transactions on Circuits and Systems for Video Technology, vol. 17, No. 9, Sep. 2007, pp. 1121-1135.

Schwarz et al., "Overview of the Scalable Video Coding Extension of the H.264/AVC Standard", IEEE Transactions on Circuits and Systems for Video Technology, vol. 17, No. 9, Sep. 2007, pp. 1103-1120.

Schwarz et al., "Constrained Inter-Layer Prediction for Single-Loop Decoding in Spatial Scalability", IEEE International Conference on Image Processing, Sep. 14, 2005, 4 pages.

International Search Report and Written Opinion received for corresponding Patent Cooperation Treaty Application No. PCT/FI2014/050515, dated Nov. 7, 2014, 16 pages.

Ugur et al., "Lightweight Single-Loop Scalability With SHVC", Joint Collaborative Team on Video Coding (JCT-VC)of ITU-T SG 16 WP 3 and ISO/IEC JTC 1/SC 29/WG 11, 12th Meeting, JCTVC-L0111, Jan. 14-23, 2013, pp. 1-2.

Sullivan et al., "Overview of the High Efficiency Video Coding (HEVC) Standard", IEEE Transactions on Circuits and Systems for Video Technology, vol. 22, No. 12, Dec. 2012, pp. 1649-1668.

Ugur et al., "Motion and Inter-Layer Prediction Constrained SEI Message", Joint Collaborative Team on Video Coding (JCT-VC)of ITU-T SG 16 WP 3 and ISO/IEC JTC 1/SC 29/WG 11, 14th Meeting, JCTVC-N0069, Jul. 25-Aug. 2, 2013, pp. 1-4.

Ye et al., "SEI Message: Independently Decodable Regions Based on Tiles", Joint Collaborative Team on Video Coding (JCT-VC) of ITU-T SG 16 WP 3 and ISO/IEC JTC 1/SC 29/WG 11, JCTVC-M0181r1, 13th Meeting, Inter Digital Communications, Apr. 18-26, 2013, pp. 1-8.

Office action received for corresponding Japanese Patent Application No. 2016-524854, dated Jan. 6, 2017, 6 pages of office action and 5 pages of Translation available.

Ye et al., "ROI Tile Sections", Joint Collaborative Team on Video Coding (JCT-VC) of ITU-T SG 16 WP 3 and ISO/IEC JTC 1/SC 29/WG 11, JCTVC-K0248_r2, 11th Meeting, InterDigital Communications, Oct. 10-19, 2012, pp. 1-7.

Suhring et al., "Tile Boundary Alignment and Inter-Layer Prediction Constraints for SHVC and MV-HEVC", Joint Collaborative Team on Video Coding (JCT-VC) of ITU-T SG 16 WP 3 and ISO/IEC JTC 1/SC 29/WG 11, JCTVC-Mxxxx, 13th Meeting, Fraunhofer HHI, Apr. 18-26, 2013, pp. 1-5.

Rapaka et al., "Parallel Processing Indications for Tiles in HEVC Extensions",Joint Collaborative Team on Video Coding (JCT-VC) of ITU-T SG 16 WP 3 and ISO/IEC JTC 1/SC 29/WG 11, JCTVC-M0334, 13th Meeting, Qualcomm Incorporated, Apr. 18-26, 2013, pp. 1-3.

Ugur et al., "Indication of Inter-layer and Motion Constrained Prediction Constraints", Joint Collaborative Team on Video Coding

(56) References Cited

OTHER PUBLICATIONS (JCT-VC) of ITU-T SG 16 WP 3 and ISO/IEC JTC 1/SC 29/WG 11, JCTVC-N0383, 14th Meeting, BoG on HLS, Jul. 25-Aug. 2, 2013, pp. 1-5.

Extended European Search Report received for corresponding European Patent Application No. 14829991.0, dated Jan. 19, 2017, 5 pages.

Flynn et al., "HEVC Range Extensions Draft 3", Joint Collaborative Team on Video Coding (JCT-VC) of ITU-T SG16 WP3 and ISO/IEC JTC1/SC29/WG11, JCTVC-M1005_V1, 13th Meeting, Editor, Apr. 18-26, 2013, pp. 1-315.

Extended European Search Report received for corresponding European Patent Application No. 14823805.8, dated Feb. 14, 2017, 12 pages.

Sato et al., "AHG9: Inter-layer Prediction Signaling", Joint Collaborative Team on Video Coding (JCT-VC) of ITU-T SG 16 WP 3 and ISO/IEC JTC 1/SC 29/WG 11, JCTVC-M0151, 13th Meeting, Sony Corp, Apr. 18-26, 2013, pp. 1-6.

Kwon et al., "Description of Scalable Video Coding Technology Proposal by Texas Instruments", Joint Collaborative Team on Video Coding (JCT-VC) of ITU-T SG 16 WP 3 and ISO/IEC JTC 1/SC 29/WG 11, JCTVC-K0038, 11th Meeting, Texas Instruments Inc., Oct. 10-19, 2012, pp. 1-44.

Wang et al., "Signaling of Scalability Information", Joint Video Team (JVT) of ISO/IEC MPEG & ITU-T VCEG (ISO/IEC JTC1/SC29/WG11 and ITU-T SG16 Q.6), JVT-P061, 16th Meeting, Nokia Corporation, Jul. 24-29, 2005, pp. 1-11.

Chen et al., "SHVC Test Model 2 (SHM 2)", Joint Collaborative Team on Video Coding (JCT-VC) of ITU-T SG16 WP3 and ISOIIEC JTC1/SC29/WG11, JCTVC-M1007v1, 13th Meeting, Editors, Apr. 18-26, 2013, 44 Pages.

Suehring et al., "Extension of (temporal) Motion Constrained Tile Sets SEI Message", Joint Collaborative Team on Video Coding (JCT-VC) of ITU-T SG 16 WP 3 and ISO/IEC JTC 1/SC 29/WG 11, JCTVC-N0088, 14th Meeting, Fraunhofer HHI, Jul. 25-Aug. 2, 2013, pp. 1-2.

Suehring et al., "Inter-layer constrained tile sets SEI Message", Joint Collaborative Team on Video Coding (JCT-VC) of ITU-T SG 16 WP 3 and ISO/IEC JTC 1/SC 29/WG 11, JCTVC-N0087, 14th Meeting, Fraunhofer HHI, Jul. 25-Aug. 2, 2013, pp. 1-3.

Office action received for corresponding Canadian Patent Application No. 2918961, dated Feb. 20, 2017, 4 pages.

Office action received for corresponding Japanese Patent Application No. 2016-528562, dated Mar. 3, 2017, 5 pages of office action and 5 pages of Translation available.

Office action received for corresponding Korean Patent Application No. 2016-7004484, dated Mar. 27, 2017, 4 pages of office action and no page of Translation available.

Notice of Allowance received for corresponding Japanese Patent Application No. 2016-524854, dated Jun. 26, 2017, 4 pages of office action and no pages of Notice of Allowance translation available.

Cheung et al., "A Use Case and High Level Syntax of SHVC: Scalability Based Region of Interest", Joint Collaborative Team on Video Coding (JCT-VC) of ITU-T SG 16 WP 3 and ISO/IEC JTC 1/SC 29/WG 11, 13th Meeting, JCTVC-M0277, Apr. 18-26, 2013, pp. 1-4.

Non-Final Office action received for corresponding U.S. Appl. No. 14/903,415, dated Jul. 14, 2017, 16 pages.

Notice of Allowance received for corresponding Korean Patent Application No. 2016-7004484, dated Jul. 19, 2017, 3 pages of office action and 1 pages of Notice of Allowance translation available.

Office action received for corresponding Korean Patent Application No. 2016-7003391, dated Sep. 15, 2017, 7 pages of office action and no pages of office action translation available.

Final Office action received for corresponding Japanese Patent Application No. 2016-528562, dated Dec. 4, 2017, 6 pages of office action and 7 pages of office action translation available.

Worrall et al., "AHG8: Inclusion of Parallel Processing Schemes in the Main Profile", Joint Collaborative Team on Video Coding (JCT-VC) of ITU-T SG 16 WP 3 and ISO/IEC JTC 1/SC 29/WG 11, JCTVC-I0153, 9th Meeting, Apr. 27-May 7, 2012, pp. 1-17.

Office action received for corresponding European Patent Application No. 14829991.0, dated Dec. 5, 2017, 5 pages.

Final Office action received for corresponding U.S. Appl. No. 14/903,415, dated Dec. 6, 2017, 17 pages.

International Search Report and Written Opinion received for corresponding Patent Cooperation Treaty Application No. PCT/FI2014/050582, dated Oct. 24, 2014, 12 pages.

Wu et al. "Motion-constrained tile sets SEI message", Document JCTVC-M0235 (v.1) in 13th Meeting of Joint Collaborative Team on Video Coding (JCT-VC) of ITU-T SG16 WP3 and ISO/IEC JTC1/SC29/WG11, Apr. 18-26, 2013, Incheon, Korea, 4 pages.

Search Report received for corresponding GB Application No. 1313113.1, dated Feb. 13, 2014, 4 pages.

APPARATUS, A METHOD AND A COMPUTER PROGRAM FOR VIDEO CODING AND DECODING

RELATED APPLICATION

This application was originally filed as PCT Application No. PCT/FI2014/050582 filed Jul. 16, 2014, which claims priority benefit from GB Patent Application No. 1313113.1, filed Jul. 23, 2013.

TECHNICAL FIELD

The present invention relates to an apparatus, a method and a computer program for video coding and decoding.

BACKGROUND INFORMATION

Some video use cases may require extracting a part of a high resolution video. Such cases include, for example, zooming to a certain area in the video, following certain objects in the video or modifying or analyzing content in a limited area in a video sequence. The most straight-forward implementation of such use cases may involve decoding complete pictures and performing the desired operations on those. This kind of an approach results in high requirements on computational operations, increase in power consumption and slowdown in the processing.

Tiles in H.265/HEVC standard and slices in H.265/HEVC and H.264/AVC standards allow video encoders to create predefined picture areas that can be decoded independently from each other. The decoder may then select which tiles or slices it needs to decode in order to access the sample values of interest. A drawback of this approach is that the encoder needs to split the picture in a rigid grid of tiles or slices. The smaller the area of an individual tile or slice is, the more specific pixel areas can be decoded independently, but at the same time the coding efficiency is seriously degraded as the encoder cannot use the information from other slices or tiles to predict information in the current slice or tile. Another drawback is that a decoder needs to typically decode significant amount of pixels outside the actual area of interest as it needs to decode all the slices and tiles that intersect with the area of interest.

SUMMARY

This invention proceeds from the consideration that in order to decode an area of interest within a video frame without the need for full decoding of unnecessary data outside said area, an improved method for carrying out a random access to such area within a video frame is introduced hereinafter.

A method according to a first embodiment comprises a method for decoding an encoded video representation from a bitstream, the method comprising
  decoding an identifier indicating that all samples within a scope of the bitstream have been coded with a prediction restriction;
  determining that the scope covers a region of interest within a picture;
  decoding at least a first coding unit preceding said region of interest in decoding order in a parse mode such that syntax elements belonging to said at least first coding unit are parsed, but a sample reconstruction process of said syntax elements is omitted; and
  decoding at least a second coding unit belonging to said region of interest such that syntax elements belonging to said at least second coding unit are parsed and a sample reconstruction process is performed to said syntax elements.

According to an embodiment, said prediction restriction comprises one or more of the following:
  No intra coding has been used for the samples;
  No intra prediction has been used for the samples;
  No in-picture sample prediction has been used for the samples;
  No intra prediction across boundaries of an elementary unit of samples has been used;
  No in-picture sample prediction across boundaries of an elementary unit of samples has been used;
  Only prediction between pictures has been used for the samples.

According to an embodiment, the method further comprises inferring or decoding the scope to be one or more of the following:
  the bitstream;
  inter-predicted pictures of the bitstream;
  at least one scalability layer within the bitstream;
  the picture;
  the region of interest.

According to an embodiment, the method further comprises selecting the first coding unit to be only parsed, and omitting the parsing and decoding of coding units preceding the first coding unit in decoding order.

According to an embodiment, the method further comprises selecting the first coding unit to be decoded in the parse mode on the basis of whether slices, tiles and/or wavefronts have been used in encoding the coding units.

According to an embodiment, when no tiles or wavefronts have been used, the first coding unit to be decoded in the parse mode is selected to be the first coding unit of the slice that immediately precedes, in decoding order, the top-left coding unit of the area that is decoded in a full decoding mode, where coding unit are parsed and subjected to a sample reconstruction process.

According to an embodiment, when wavefronts have been used, the first coding unit to be decoded in the parse mode is selected to be the first coding unit of a CTU row containing the top-left coding unit of the area to be decoded in the full decoding mode.

According to an embodiment, when tiles have been used, the first coding unit to be decoded in the parse mode is selected to be the first coding unit of the tile that immediately precedes, in decoding order, the top-left coding unit of the area that is decoded in the full decoding mode.

According to an embodiment, the method further comprising locating the start of the coded data for a CTU row or a tile from entry points indicated in or along the bitstream.

According to an embodiment, the method further comprising selecting the coding units for which the parsing and the decoding is omitted on the basis of whether slices, tiles and/or wavefronts have been used in encoding the coding units.

According to an embodiment, when no tiles or wavefronts have been used and a slice is not even partially within the area to be decoded in the full decoding mode, the parsing and decoding of the slice may be omitted.

According to an embodiment, when wavefronts have been used and a CTU row is not even partially within the area to be decoded in the full decoding mode, the parsing and decoding of the CTU row may be omitted.

According to an embodiment, when tiles have been used and a tile is not even partially within the area to be decoded in the full decoding mode, the parsing and decoding of the tile may be omitted.

According to an embodiment, the method further comprising performing in the full decoding mode for a complete picture, if a full decoding of a picture is desired.

According to an embodiment, the region of interest that said identifier applies is one of a complete video frame, a slice, a tile, a constituent picture in frame-packed video, or an area indicated in other ways.

According to an embodiment, the identifier indicates that an in-loop filtering process is disabled for the region of interest.

According to an embodiment, the full decoding mode involves a modified decoding process when only a region is decoded which is different than the standard compliant decoding.

According to an embodiment, the method further comprising generating entropy decoding entry point (EDEP) data for at least one point or coding tree unit or coding unit of a coded picture.

According to an embodiment, the method further comprising decoding and using EDEP data similarly to entry points for CTU rows or for tiles to select the first coding unit to be decoded in the parse mode.

An apparatus according to a second embodiment comprises:
  a video decoder configured for decoding a bitstream comprising an encoded video presentation, the video decoder being configured for
  decoding an identifier indicating that all samples within a scope of the bitstream have been coded with a prediction restriction;
  determining that the scope covers a region of interest within a picture;
  decoding at least a first coding unit preceding said region of interest in decoding order in a parse mode such that syntax elements belonging to said at least first coding unit are parsed, but a sample reconstruction process of said syntax elements is omitted; and
  decoding at least a second coding unit belonging to said region of interest such that syntax elements belonging to said at least second coding unit are parsed and a sample reconstruction process is performed to said syntax elements.

According to a third embodiment there is provided a computer readable storage medium stored with code thereon for use by an apparatus, which when executed by a processor, causes the apparatus to perform:
  decoding an identifier indicating that all samples within a scope of the bitstream have been coded with a prediction restriction;
  determining that the scope covers a region of interest within a picture;
  decoding at least a first coding unit preceding said region of interest in decoding order in a parse mode such that syntax elements belonging to said at least first coding unit are parsed, but a sample reconstruction process of said syntax elements is omitted; and
  decoding at least a second coding unit belonging to said region of interest such that syntax elements belonging to said at least second coding unit are parsed and a sample reconstruction process is performed to said syntax elements.

According to a fourth embodiment there is provided at least one processor and at least one memory, said at least one memory stored with code thereon, which when executed by said at least one processor, causes an apparatus to perform:
  decoding an identifier indicating that all samples within a scope of the bitstream have been coded with a prediction restriction;
  determining that the scope covers a region of interest within a picture;
  decoding at least a first coding unit preceding said region of interest in decoding order in a parse mode such that syntax elements belonging to said at least first coding unit are parsed, but a sample reconstruction process of said syntax elements is omitted; and
  decoding at least a second coding unit belonging to said region of interest such that syntax elements belonging to said at least second coding unit are parsed and a sample reconstruction process is performed to said syntax elements.

A method according to a fifth embodiment comprises a method for encoding a video representation, the method comprising
  encoding a first picture;
  encoding at least an area within a second picture with a prediction restriction from the first picture; and
  generating an identifier associated with the second coded picture indicating that said prediction restriction has been used for at least samples of said area within the second picture.

According to an embodiment, said prediction restriction comprises one or more of the following:
  No intra coding has been used for the samples;
  No intra prediction has been used for the samples;
  No in-picture sample prediction has been used for the samples;
  No intra prediction across boundaries of an elementary unit of samples has been used;
  No in-picture sample prediction across boundaries of an elementary unit of samples has been used;
  Only prediction between pictures has been used for the samples.

According to an embodiment, the encoder may include the identifier into and the decoder may decode the identifier from for example one or more of the following:
  A supplemental enhancement information (SEI) message
  A sequence parameter set (SPS)
  A picture parameter set (PPS)
  Video usability information (VUI)
  A container file format structure.

According to an embodiment, the method further comprising generating entropy decoding entry point (EDEP) data for at least one point or coding tree unit or coding unit of a coded picture.

An apparatus according to a sixth embodiment comprises:
  a video encoder configured for encoding a video representation, wherein said video encoder is further configured for
  encoding a first picture;
  encoding at least an area within a second picture using inter coding only from the first picture; and
  generating an identifier associated with the second coded picture indicating that only inter prediction has been used for at least said area within the second picture.

According to a seventh embodiment there is provided a computer readable storage medium stored with code thereon for use by an apparatus, which when executed by a processor, causes the apparatus to perform:

encoding a first picture;
encoding at least an area within a second picture with a prediction restriction from the first picture; and
generating an identifier associated with the second coded picture indicating that said prediction restriction has been used for at least samples of said area within the second picture.

According to an eighth embodiment there is provided at least one processor and at least one memory, said at least one memory stored with code thereon, which when executed by said at least one processor, causes an apparatus to perform:
encoding a first picture;
encoding at least an area within a second picture with a prediction restriction from the first picture; and
generating an identifier associated with the second coded picture indicating that said prediction restriction has been used for at least samples of said area within the second picture.

According to a ninth embodiment there is provided a video decoder configured for decoding an encoded video representation, the video decoder being configured for
decoding an identifier indicating that all samples within a scope of the bitstream have been coded with a prediction restriction;
determining that the scope covers a region of interest within a picture;
decoding at least a first coding unit preceding said region of interest in decoding order in a parse mode such that syntax elements belonging to said at least first coding unit are parsed, but a sample reconstruction process of said syntax elements is omitted; and
decoding at least a second coding unit belonging to said region of interest such that syntax elements belonging to said at least second coding unit are parsed and a sample reconstruction process is performed to said syntax elements.

According to a tenth embodiment there is provided a video encoder configured for encoding a video representation, wherein said video encoder is further configured for
encoding a first picture;
encoding at least an area within a second picture with a prediction restriction from the first picture; and
generating an identifier associated with the second coded picture indicating that said prediction restriction has been used for at least samples of said area within the second picture.

DESCRIPTION OF THE DRAWINGS

For better understanding of the present invention, reference will now be made by way of example to the accompanying drawings in which.

DETAILED DESCRIPTION OF SOME EXAMPLE EMBODIMENTS OF THE INVENTION

Figure 1:
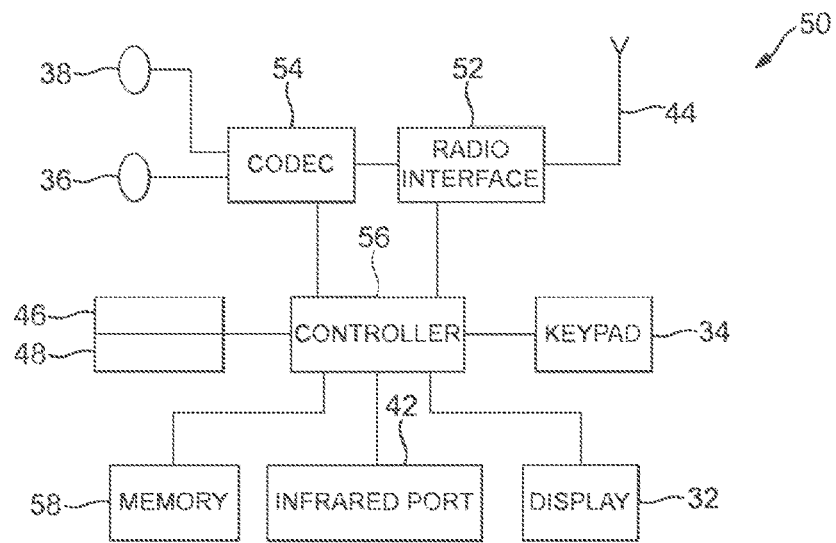
FIG. 1 shows schematically an electronic device employing some embodiments of the invention.
Figure 2:
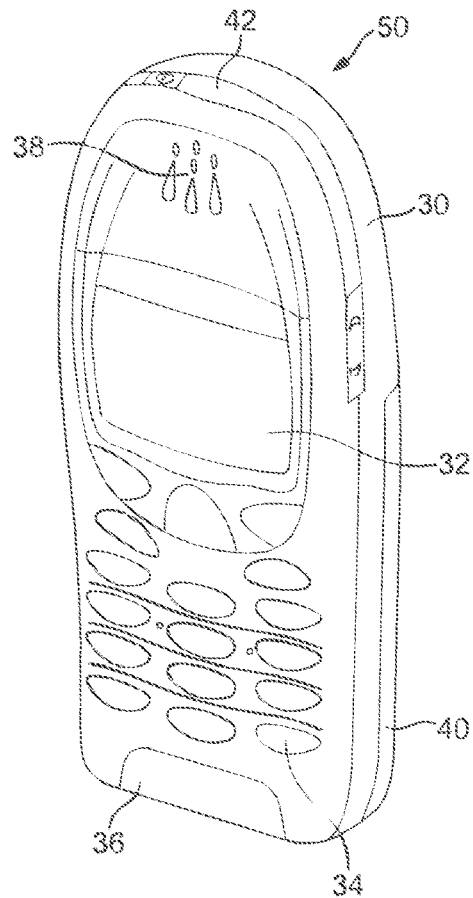
FIG. 2 shows schematically a user equipment suitable for employing some embodiments of the invention.

The following describes in further detail suitable apparatus and possible mechanisms for carrying out the embodiments. In this regard reference is first made to FIG. 1 which shows a schematic block diagram of an exemplary apparatus or electronic device 50, which may incorporate a codec according to an embodiment of the invention.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In other embodiments of the invention, the apparatus may receive the video image data for processing from another device prior to transmission and/or storage. In other embodiments of the invention, the apparatus 50 may receive either wirelessly or by a wired connection the image for coding/decoding.

Figure 3:
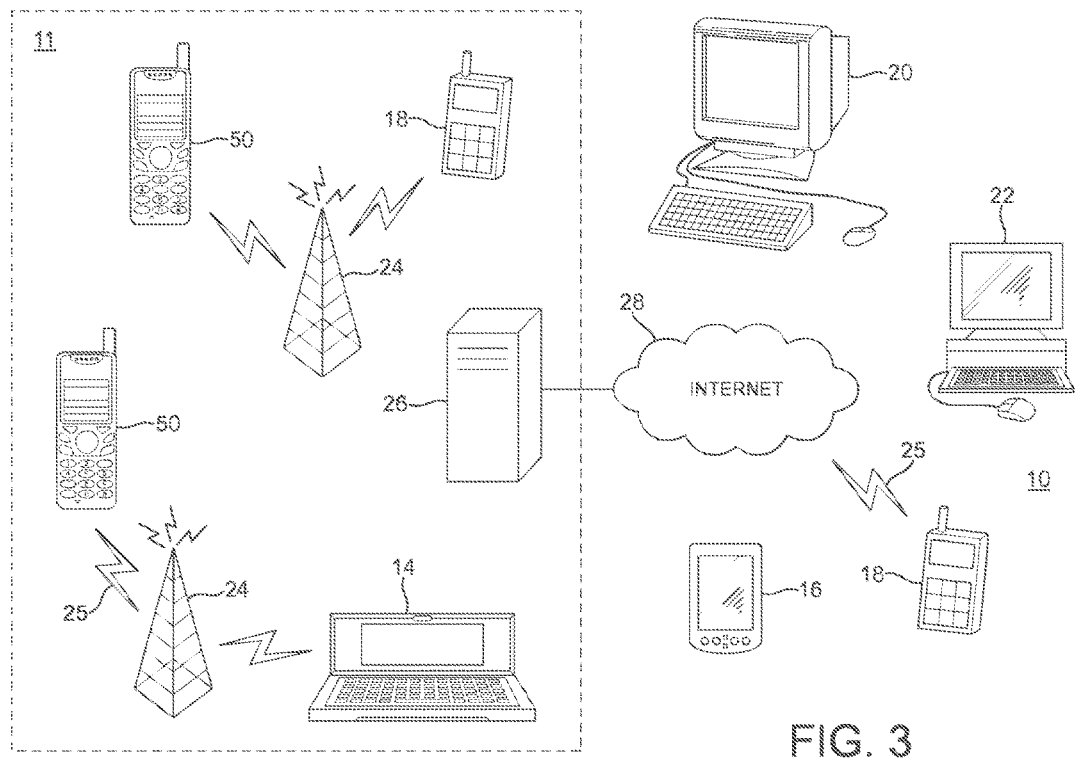
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Video codec consists of an encoder that transforms the input video into a compressed representation suited for storage/transmission and a decoder that can uncompress the compressed video representation back into a viewable form. Typically encoder discards some information in the original video sequence in order to represent the video in a more compact form (that is, at lower bitrate).

Typical hybrid video codecs, for example ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

Video coding is typically a two-stage process: First, a prediction of the video signal is generated based on previous coded data. Second, the residual between the predicted signal and the source signal is coded. Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters within a picture and intra prediction may be collectively referred to as in-picture prediction.

Figure 4:
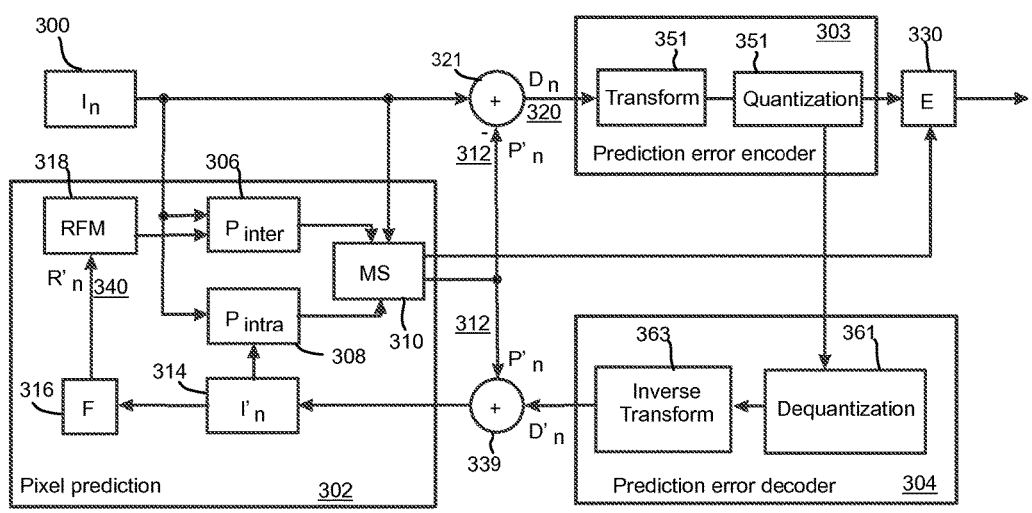
FIG. 4 shows schematically an encoder suitable for implementing some embodiments of the invention.

With respect to FIG. 4, a block diagram of a video encoder suitable for carrying out embodiments of the invention is shown. FIG. 4 shows the encoder as comprising a pixel predictor 302, prediction error encoder 303 and prediction error decoder 304. FIG. 4 also shows an embodiment of the pixel predictor 302 as comprising an inter-predictor 306, an intra-predictor 308, a mode selector 310, a filter 316, and a reference frame memory 318. The pixel predictor 302 receives the image 300 to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the image 300.

Depending on which encoding mode is selected to encode the current block, the output of the inter-predictor 306 or the output of one of the optional intra-predictor modes or the output of a surface encoder within the mode selector is passed to the output of the mode selector 310. The output of the mode selector is passed to a first summing device 321. The first summing device may subtract the output of the pixel predictor 302 from the image 300 to produce a first prediction error signal 320 which is input to the prediction error encoder 303.

The pixel predictor 302 further receives from a preliminary reconstructor 339 the combination of the prediction representation of the image block 312 and the output 338 of the prediction error decoder 304. The preliminary reconstructed image 314 may be passed to the intra-predictor 308 and to a filter 316. The filter 316 receiving the preliminary representation may filter the preliminary representation and output a final reconstructed image 340 which may be saved in a reference frame memory 318. The reference frame memory 318 may be connected to the inter-predictor 306 to be used as the reference image against which a future image 300 is compared in inter-prediction operations.

The operation of the pixel predictor 302 may be configured to carry out any known pixel prediction algorithm known in the art.

The prediction error encoder 303 comprises a transform unit 342 and a quantizer 344. The transform unit 342 transforms the first prediction error signal 320 to a transform domain. The transform is, for example, the DCT transform. The quantizer 344 quantizes the transform domain signal, e.g. the DCT coefficients, to form quantized coefficients.

The prediction error decoder 304 receives the output from the prediction error encoder 303 and performs the opposite processes of the prediction error encoder 303 to produce a decoded prediction error signal 338 which, when combined with the prediction representation of the image block 312 at the second summing device 339, produces the preliminary reconstructed image 314. The prediction error decoder may be considered to comprise a dequantizer 361, which dequantizes the quantized coefficient values, e.g. DCT coefficients, to reconstruct the transform signal and an inverse transformation unit 363, which performs the inverse transformation to the reconstructed transform signal wherein the output of the inverse transformation unit 363 contains reconstructed block(s). The prediction error decoder may also comprise a macroblock filter which may filter the reconstructed macroblock according to further decoded information and filter parameters.

The entropy encoder 330 receives the output of the prediction error encoder 303 and may perform a suitable entropy encoding/variable length encoding on the signal to provide error detection and correction capability.

Entropy coding/decoding may be performed in many ways. For example, context-based coding/decoding may be applied, where in both the encoder and the decoder modify the context state of a coding parameter based on previously coded/decoded coding parameters. Context-based coding may for example be context adaptive binary arithmetic coding (CABAC) or context-based variable length coding (CAVLC) or any similar entropy coding. Entropy coding/decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

The High Efficiency Video Coding standard (which may be referred to as HEVC or H.265/HEVC) was developed by the Joint Collaborative Team—Video Coding (JCT-VC) of VCEG and MPEG. The standard is referred to as ITU-T Recommendation H.265 and ISO/IEC International Standard 23008-2, also known as MPEG-H Part 2 High Efficiency Video Coding (HEVC). There are currently ongoing standardization projects to develop extensions to H.265/HEVC, including scalable, multiview, three-dimensional, and fidelity range extensions.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in a HEVC standard—hence, they are described below jointly. The aspects of the invention are not limited to H.264/AVC or HEVC, but rather the description is given for one possible basis on top of which the invention may be partly or fully realized.

When describing H.264/AVC and HEVC as well as in example embodiments, common notation for arithmetic operators, logical operators, relational operators, bit-wise operators, assignment operators, and range notation e.g. as specified in H.264/AVC or a draft HEVC may be used. Furthermore, common mathematical functions e.g. as specified in H.264/AVC or a draft HEVC may be used and a common order of precedence and execution order (from left to right or from right to left) of operators e.g. as specified in H.264/AVC or a draft HEVC may be used.

When describing H.264/AVC and HEVC as well as in example embodiments, the following descriptors may be used to specify the parsing process of each syntax element.

b(8): byte having any pattern of bit string (8 bits).

se(v): signed integer Exp-Golomb-coded syntax element with the left bit first.

u(n): unsigned integer using n bits. When n is "v" in the syntax table, the number of bits varies in a manner dependent on the value of other syntax elements. The parsing process for this descriptor is specified by n next bits from the bitstream interpreted as a binary representation of an unsigned integer with the most significant bit written first.

ue(v): unsigned integer Exp-Golomb-coded syntax element with the left bit first.

An Exp-Golomb bit string may be converted to a code number (codeNum) for example using the following table:

| Bit string | codeNum |
|---|---|
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| . . . | . . . |

A code number corresponding to an Exp-Golomb bit string may be converted to se(v) for example using the following table:

| codeNum | syntax element value |
|---|---|
| 0 | 0 |
| 1 | 1 |
| 2 | −1 |
| 3 | 2 |
| 4 | −2 |
| 5 | 3 |
| 6 | −3 |
| . . . | . . . |

When describing H.264/AVC and HEVC as well as in example embodiments, syntax structures, semantics of syntax elements, and decoding process may be specified as follows. Syntax elements in the bitstream are represented in bold type. Each syntax element is described by its name (all lower case letters with underscore characters), optionally its one or two syntax categories, and one or two descriptors for its method of coded representation. The decoding process behaves according to the value of the syntax element and to the values of previously decoded syntax elements. When a value of a syntax element is used in the syntax tables or the text, it appears in regular (i.e., not bold) type. In some cases the syntax tables may use the values of other variables derived from syntax elements values. Such variables appear in the syntax tables, or text, named by a mixture of lower case and upper case letter and without any underscore characters. Variables starting with an upper case letter are derived for the decoding of the current syntax structure and all depending syntax structures. Variables starting with an upper case letter may be used in the decoding process for later syntax structures without mentioning the originating syntax structure of the variable. Variables starting with a lower case letter are only used within the context in which they are derived. In some cases, "mnemonic" names for syntax element values or variable values are used interchangeably with their numerical values. Sometimes "mnemonic" names are used without any associated numerical values. The association of values and names is specified in the text. The names are constructed from one or more groups of letters separated by an underscore character. Each group starts with an upper case letter and may contain more upper case letters.

When describing H.264/AVC and HEVC as well as in example embodiments, a syntax structure may be specified using the following. A group of statements enclosed in curly brackets is a compound statement and is treated functionally as a single statement. A "while" structure specifies a test of whether a condition is true, and if true, specifies evaluation of a statement (or compound statement) repeatedly until the condition is no longer true. A "do . . . while" structure specifies evaluation of a statement once, followed by a test of whether a condition is true, and if true, specifies repeated evaluation of the statement until the condition is no longer true. An "if . . . else" structure specifies a test of whether a condition is true, and if the condition is true, specifies evaluation of a primary statement, otherwise, specifies evaluation of an alternative statement. The "else" part of the structure and the associated alternative statement is omitted if no alternative statement evaluation is needed. A "for" structure specifies evaluation of an initial statement, followed by a test of a condition, and if the condition is true, specifies repeated evaluation of a primary statement followed by a subsequent statement until the condition is no longer true.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

In the description of existing standards as well as in the description of example embodiments, a syntax element may be defined as an element of data represented in the bitstream. A syntax structure may be defined as zero or more syntax elements present together in the bitstream in a specified order.

A profile may be defined as a subset of the entire bitstream syntax that is specified by a decoding/coding standard or specification. Within the bounds imposed by the syntax of a given profile it is still possible to require a very large variation in the performance of encoders and decoders depending upon the values taken by syntax elements in the bitstream such as the specified size of the decoded pictures. In many applications, it might be neither practical nor economic to implement a decoder capable of dealing with all hypothetical uses of the syntax within a particular profile. In order to deal with this issue, levels may be used. A level may be defined as a specified set of constraints imposed on values of the syntax elements in the bitstream and variables specified in a decoding/coding standard or specification. These constraints may be simple limits on values. Alternatively or in addition, they may take the form of constraints on arithmetic combinations of values (e.g., picture width multiplied by picture height multiplied by number of pictures decoded per second). Other means for specifying constraints for levels may also be used. Some of the constraints specified in a level may for example relate to the maximum picture size, maximum bitrate and maximum data rate in terms of coding units, such as macroblocks, per a time period, such as a second. The same set of levels may be defined for all profiles. It may be preferable for example to increase interoperability of terminals implementing different profiles that most or all aspects of the definition of each level may be common across different profiles.

An elementary unit for the input to an H.264/AVC or HEVC encoder and the output of an H.264/AVC or HEVC decoder, respectively, is a picture. In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma pictures may be absent (and hence monochrome sampling may be in use) or may be subsampled when compared to luma pictures. Some chroma formats may be summarized as follows:

In monochrome sampling there is only one sample array, which may be nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

When chroma subsampling is in use (e.g. 4:2:0 or 4:2:2 chroma sampling), the location of chroma samples with respect to luma samples may be determined in the encoder side (e.g. as pre-processing step or as part of encoding). The chroma sample positions with respect to luma sample positions may be pre-defined for example in a coding standard, such as H.264/AVC or HEVC, or may be indicated in the bitstream for example as part of VUI of H.264/AVC or HEVC.

A partitioning may be defined as a division of a set into subsets such that each element of the set is in exactly one of the subsets. A picture partitioning may be defined as a division of a picture into smaller non-overlapping units. A block partitioning may be defined as a division of a block into smaller non-overlapping units, such as sub-blocks. In some cases term block partitioning may be considered to cover multiple levels of partitioning, for example partitioning of a picture into slices, and partitioning of each slice into smaller units, such as macroblocks of H.264/AVC. It is noted that the same unit, such as a picture, may have more than one partitioning. For example, a coding unit of a draft HEVC standard may be partitioned into prediction units and separately by another quadtree into transform units.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

During the course of HEVC standardization the terminology for example on picture partitioning units has evolved. In the next paragraphs, some non-limiting examples of HEVC terminology are provided.

In HEVC (de)coding, samples are processed in units of coding tree blocks. The array size for each luma coding tree block may be determined and included in the bitstream by the encoder and/or decoded from the bitstream by the decoder. specified in the bistreamin both width and height is CtbSizeY in units of samples. The width and height of the array for each chroma coding tree block may be derived from those of the luma coding tree block and the chroma format being used.

In HEVC, each coding tree block is assigned a partition signalling to identify the block sizes for intra or inter prediction and for transform coding. The partitioning is a recursive quadtree partitioning. The root of the quadtree is associated with the coding tree block. The quadtree is split until a leaf is reached, which is referred to as the coding block. When the component width is not an integer number of the coding tree block size, the coding tree blocks at the right component boundary are incomplete. When the component height is not an integer multiple of the coding tree block size, the coding tree blocks at the bottom component boundary are incomplete.

In HEVC, the coding block is the root node of two trees, the prediction tree and the transform tree. The prediction tree specifies the position and size of prediction blocks. The transform tree specifies the position and size of transform blocks. The splitting information for luma and chroma is identical for the prediction tree and may or may not be identical for the transform tree.

The blocks and associated syntax structures may be encapsulated in a "unit" as follows:

One prediction block (when monochrome pictures or separate color planes are in use) or three prediction blocks (luma and chroma) and associated prediction syntax structures units are encapsulated in a prediction unit.

One transform block (when monochrome pictures or separate color planes are in use) or three transform blocks (luma and chroma) and associated transform syntax structures units are encapsulated in a transform unit.

One coding block (when monochrome pictures or separate color planes are in use) or three coding blocks (luma and chroma), the associated coding syntax structures and the associated prediction and transform units are encapsulated in a coding unit.

One coding tree block (when monochrome pictures or separate color planes are in use) or three coding tree blocks (luma and chroma), the associated coding tree syntax structures and the associated coding units are encapsulated in a coding tree unit.

Some terms used in HEVC may be described as follows. Video pictures are divided into coding units (CU) covering the area of the picture. A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. A CU with the maximum allowed size may be named as LCU (largest coding unit) or a coding tree unit (CTU) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs). Similarly each TU is associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

In the HEVC standard, a picture can be partitioned in tiles, which are rectangular and contain an integer number of LCUs. In the HEVC standard, the partitioning to tiles forms a regular grid, where heights and widths of tiles differ from each other by one LCU at the maximum. Tiles are ordered in the bitstream consecutively in the raster scan within the picture. A tile may contain an integer number of slices. Tile boundaries, similarly to slice boundaries, break entropy coding, parameter prediction and intra prediction dependencies. Hence, a tile can be processed independently except for in-loop filtering, which can cross tile boundaries unless turned off by the encoder (and indicated in the bitstream).

In the HEVC, a slice consists of an integer number of LCUs. The LCUs are scanned in the raster scan order of LCUs within tiles or within a picture, if tiles are not in use. A slice may contain an integer number of tiles or a slice can be contained in a tile. Within an LCU, the CUs have a specific scan order.

In HEVC, a slice contains one independent slice segment and all subsequent dependent slice segments (if any) that precede the next independent slice segment (if any) within the same access unit. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

In typical video codecs the motion information is indicated with motion vectors associated with each motion compensated image block. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired Macroblock mode and associated motion vectors. This kind of cost function uses a weighting factor λ to tie together the (exact or estimated) image distortion due to lossy coding methods and the (exact or estimated) amount of information that is required to represent the pixel values in an image area:

$$C=D+\lambda R, \tag{1}$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

In the following, slice types available in some coding standards are categorized.

A raster-scan-order-slice is a coded segment that consists of consecutive macroblocks or alike in raster scan order. For example, video packets of MPEG-4 Part 2 and groups of macroblocks (GOBs) starting with a non-empty GOB header in H.263 are examples of raster-scan-order slices.

A rectangular slice is a coded segment that consists of a rectangular area of macroblocks or alike. A rectangular slice may be higher than one macroblock or alike row and narrower than the entire picture width. H.263 includes an optional rectangular slice submode, and H.261 GOBs can also be considered as rectangular slices.

A flexible slice can contain any pre-defined macroblock (or alike) locations. The H.264/AVC codec allows grouping of macroblocks to more than one slice groups. A slice group can contain any macroblock locations, including non-adjacent macroblock locations. A slice in some profiles of H.264/AVC consists of at least one macroblock within a particular slice group in raster scan order.

The elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit and whether a coded slice contained in the NAL unit is a part of a reference picture or a non-reference picture.

H.264/AVC NAL unit header includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. The header for SVC and MVC NAL units may additionally contain various indications related to the scalability and multiview hierarchy.

In HEVC, a two-byte NAL unit header is used for all specified NAL unit types. The NAL unit header contains one reserved bit, a six-bit NAL unit type indication, a six-bit reserved field (called nuh_layer_id) and a three-bit temporal_id_plus1 indication for temporal level. The temporal_id_plus1 syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to TID does not use any picture having a TemporalId greater than TID as inter prediction reference. A sub-layer or a temporal sub-layer may be defined to be a temporal scalable layer of a temporal scalable bitstream, consisting of VCL NAL units with a particular value of the TemporalId variable and the associated non-VCL NAL units. Without loss of generality, in some example embodiments a variable LayerId is derived from the value of nuh_layer_id for example as follows: LayerId=nuh_layer_id. In the following, LayerId, nuh_layer_id and layer_id are used interchangeably unless otherwise indicated.

It is expected that nuh_layer_id and/or similar syntax elements in NAL unit header would carry information on the scalability hierarchy. For example, the LayerId value nuh_layer_id and/or similar syntax elements may be mapped to values of variables or syntax elements describing different scalability dimensions, such as quality_id or similar, dependency_id or similar, any other type of layer identifier, view order index or similar, view identifier, an indication whether the NAL unit concerns depth or texture i.e. depth_flag or similar, or an identifier similar to priority_id of SVC indicating a valid sub-bitstream extraction if all NAL units greater than a specific identifier value are removed from the bitstream. nuh_layer_id and/or similar syntax elements may be partitioned into one or more syntax elements indicating scalability properties. For example, a certain number of bits among nuh_layer_id and/or similar syntax elements may be used for dependency_id or similar, while another certain number of bits among nuh_layer_id and/or similar syntax elements may be used for quality_id or similar. Alternatively, a mapping of LayerId values or similar to values of variables or syntax elements describing different scalability dimensions may be provided for example in a Video Parameter Set, a Sequence Parameter Set or another syntax structure.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In HEVC, coded slice NAL units contain syntax elements representing one or more CU.

In H.264/AVC and HEVC a coded slice NAL unit can be indicated to be a coded slice in an Instantaneous Decoding Refresh (IDR) picture or coded slice in a non-IDR picture In HEVC, a coded slice NAL unit can be indicated to be one of the following types.

| nal_unit_type | Name of nal_unit_type | Content of NAL unit and RBSP syntax structure |
|---|---|---|
| 0, 1 | TRAIL_N, TRAIL_R | Coded slice segment of a non-TSA, non-STSA trailing picture slice_segment_layer_rbsp( ) |
| 2, 3 | TSA_N, TSA_R | Coded slice segment of a TSA picture slice_segment_layer_rbsp( ) |
| 4, 5 | STSA_N, STSA_R | Coded slice segment of an STSA picture slice_layer_rbsp( ) |

| nal_unit_type | Name of nal_unit_type | Content of NAL unit and RBSP syntax structure |
|---|---|---|
| 6, 7 | RADL_N, RADL_R | Coded slice segment of a RADL picture slice_layer_rbsp( ) |
| 8, 9 | RASL_N, RASL_R, | Coded slice segment of a RASL picture slice_layer_rbsp( ) |
| 10, 12, 14 | RSV_VCL_N10 RSV_VCL_N12 RSV_VCL_N14 | Reserved // reserved non-RAP non-reference VCL NAL unit types |
| 11, 13, 15 | RSV_VCL_R11 RSV_VCL_R13 RSV_VCL_R15 | Reserved // reserved non-RAP reference VCL NAL unit types |
| 16, 17, 18 | BLA_W_LP BLA_W_DLP BLA_N_LP | Coded slice segment of a BLA picture slice_segment_layer_rbsp( ) |
| 19, 20 | IDR_W_DLP IDR_N_LP | Coded slice segment of an IDR picture slice_segment_layer_rbsp( ) |
| 21 | CRA_NUT | Coded slice segment of a CRA picture slice_segment_layer_rbsp( ) |
| 22, 23 | RSV_RAP_VCL22 ... RSV_RAP_VCL23 | Reserved // reserved RAP VCL NAL unit types |
| 24 ... 31 | RSV_VCL24 ... RSV_VCL31 | Reserved // reserved non-RAP VCL NAL unit types |

In HEVC, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also or alternatively be referred to as intra random access point (IRAP) picture, is a picture where each slice or slice segment has nal_unit_type in the range of 16 to 23, inclusive. A RAP picture contains only intra-coded slices, and may be a BLA picture, a CRA picture or an IDR picture. The first picture in the bitstream is a RAP picture. Provided the necessary parameter sets are available when they need to be activated, the RAP picture and all subsequent non-RASL pictures in decoding order can be correctly decoded without performing the decoding process of any pictures that precede the RAP picture in decoding order. There may be pictures in a bitstream that contain only intra-coded slices that are not RAP pictures.

In HEVC a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL pictures, may use pictures decoded before the CRA picture as a reference. Pictures that follow a CRA picture in both decoding and output order are decodable if random access is performed at the CRA picture, and hence clean random access is achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order. The associated RAP picture is the previous RAP picture in decoding order (if present). A leading picture may either be a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture. In some earlier drafts of the HEVC standard, a RASL picture was referred to a Tagged for Discard (TFD) picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture. In some earlier drafts of the HEVC standard, a RADL picture was referred to a Decodable Leading Picture (DLP).

Decodable leading pictures may be such that can be correctly decoded when the decoding is started from the CRA picture. In other words, decodable leading pictures use only the initial CRA picture or subsequent pictures in decoding order as reference in inter prediction. Non-decodable leading pictures are such that cannot be correctly decoded when the decoding is started from the initial CRA picture. In other words, non-decodable leading pictures use pictures prior, in decoding order, to the initial CRA picture as references in inter prediction.

When a part of a bitstream starting from a CRA picture is included in another bitstream, the RASL pictures associated with the CRA picture might not be correctly decodable, because some of their reference pictures might not be present in the combined bitstream. To make such a splicing operation straightforward, the NAL unit type of the CRA picture can be changed to indicate that it is a BLA picture. The RASL pictures associated with a BLA picture may not be correctly decodable hence are not be output/displayed. Furthermore, the RASL pictures associated with a BLA picture may be omitted from decoding.

A BLA picture may be the first picture in the bitstream in decoding order, or may appear later in the bitstream. Each BLA picture begins a new coded video sequence, and has similar effect on the decoding process as an IDR picture. However, a BLA picture contains syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream. When a BLA picture has nal_unit_type equal to BLA_W_LP, it may also have associated RADL pictures, which are specified to be decoded. When a BLA picture has nal_unit_type equal to BLA_W_DLP, it does not have associated RASL pictures but may have associated RADL pictures, which are specified to be decoded. BLA_W_DLP may also be referred to as BLA_W_RADL. When a BLA picture has nal_unit_type equal to BLA_N_LP, it does not have any associated leading pictures.

An IDR picture having nal_unit_type equal to IDR_N_LP does not have associated leading pictures present in the bitstream. An IDR picture having nal_unit_type equal to IDR_W_DLP does not have associated RASL pictures present in the bitstream, but may have associated RADL pictures in the bitstream. IDR_W_DLP may also be referred to as IDR_W_RADL.

When the value of nal_unit_type is equal to TRAIL_N, TSA_N, STSA_N, RADL_N, RASL_N, RSV_VCL_N10, RSV_VCL_N12, or RSV_VCL_N14, the decoded picture is not used as a reference for any other picture of the same temporal sub-layer. That is, in a draft HEVC standard, when the value of nal_unit_type is equal to TRAIL_N, TSA_N, STSA_N, RADL_N, RASL_N, RSV_VCL_N10, RSV_VCL_N12, or RSV_VCL_N14, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N, STSA_N, RADL_N, RASL_N, RSV_VCL_N10, RSV_VCL_N12, or RSV_VCL_N14 may be discarded without affecting the decodability of other pictures with the same value of TemporalId.

A trailing picture may be defined as a picture that follows the associated RAP picture in output order. Any picture that is a trailing picture does not have nal_unit_type equal to RADL_N, RADL_R, RASL_N or RASL_R. Any picture that is a leading picture may be constrained to precede, in decoding order, all trailing pictures that are associated with the same RAP picture. No RASL pictures are present in the bitstream that are associated with a BLA picture having nal_unit_type equal to BLA_W_DLP or BLA_N_LP. No RADL pictures are present in the bitstream that are associated with a BLA picture having nal_unit_type equal to BLA_N_LP or that are associated with an IDR picture having nal_unit_type equal to IDR_N_LP. Any RASL picture associated with a CRA or BLA picture may be constrained to precede any RADL picture associated with the CRA or BLA picture in output order. Any RASL picture associated with a CRA picture may be constrained to follow, in output order, any other RAP picture that precedes the CRA picture in decoding order.

In HEVC there are two picture types, the TSA and STSA picture types, that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

A non-VCL NAL unit may be for example one of the following types: a sequence parameter set, a picture parameter set, a supplemental enhancement information (SEI) NAL unit, an access unit delimiter, an end of sequence NAL unit, an end of stream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. There are three NAL units specified in H.264/AVC to carry sequence parameter sets: the sequence parameter set NAL unit containing all the data for H.264/AVC VCL NAL units in the sequence, the sequence parameter set extension NAL unit containing the data for auxiliary coded pictures, and the subset sequence parameter set for MVC and SVC VCL NAL units. In the HEVC standard a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

An Adaptation Parameter Set (APS), which includes parameters that are likely to be unchanged in several coded slices but may change for example for each picture or each few pictures was proposed for HEVC but eventually not adopted into the standard. The APS syntax structure has been proposed to include parameters or syntax elements related to quantization matrices (QM), adaptive sample offset (SAO), adaptive loop filtering (ALF), and deblocking filtering. An APS may also be a NAL unit and coded without reference or prediction from any other NAL unit. An identifier, referred to as aps_id syntax element, is included in APS NAL unit, and included and used in the slice header to refer to a particular APS. An APS syntax structure may only contain ALF parameters.

The HEVC standard also includes a video parameter set (VPS) NAL unit. A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3DV. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. In a scalable extension of HEVC, VPS may for example include a mapping of the LayerId value derived from the NAL unit header to one or more scalability dimension values, for example correspond to dependency_id, quality_id, view_id, and depth_flag for the layer defined similarly to SVC and MVC. VPS may include profile and level information for one or more layers as well as the profile and/or level for one or more temporal sublayers (consisting of VCL NAL units at and below certain temporal_id values) of a layer representation.

H.264/AVC and HEVC syntax allows many instances of parameter sets, and each instance is identified with a unique identifier. In order to limit the memory usage needed for parameter sets, the value range for parameter set identifiers has been limited. In H.264/AVC and HEVC standard, each slice header includes the identifier of the picture parameter set that is active for the decoding of the picture that contains the slice, and each picture parameter set contains the identifier of the active sequence parameter set. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

A parameter set may be activated by a reference from a slice or from another active parameter set or in some cases from another syntax structure such as a buffering period SEI message.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

A coded picture is a coded representation of a picture. A coded picture in H.264/AVC comprises the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In the HEVC, no redundant coded picture has been specified.

In H.264/AVC, an access unit comprises a primary coded picture and those NAL units that are associated with it. In HEVC, an access unit is defined as a set of NAL units that are associated with each other according to a specified classification rule, are consecutive in decoding order, and contain exactly one coded picture. In H.264/AVC, the appearance order of NAL units within an access unit is constrained as follows. An optional access unit delimiter NAL unit may indicate the start of an access unit. It is followed by zero or more SEI NAL units. The coded slices of the primary coded picture appear next. In H.264/AVC, the coded slice of the primary coded picture may be followed by coded slices for zero or more redundant coded pictures. A redundant coded picture is a coded representation of a picture or a part of a picture. A redundant coded picture may be decoded if the primary coded picture is not received by the decoder for example due to a loss in transmission or a corruption in physical storage medium.

In H.264/AVC, an access unit may also include an auxiliary coded picture, which is a picture that supplements the primary coded picture and may be used for example in the display process. An auxiliary coded picture may for example be used as an alpha channel or alpha plane specifying the transparency level of the samples in the decoded pictures. An alpha channel or plane may be used in a layered composition or rendering system, where the output picture is formed by overlaying pictures being at least partly transparent on top of each other. An auxiliary coded picture has the same syntactic and semantic restrictions as a monochrome redundant coded picture. In H.264/AVC, an auxiliary coded picture contains the same number of macroblocks as the primary coded picture.

In H.264/AVC, a coded video sequence is defined to be a sequence of consecutive access units in decoding order from an IDR access unit, inclusive, to the next IDR access unit, exclusive, or to the end of the bitstream, whichever appears earlier. In HEVC, a coded video sequence may be defined to be a sequence of access units that consists, in decoding order, of a CRA access unit that is the first access unit in the bitstream, an IDR access unit or a BLA access unit, followed by zero or more non-IDR and non-BLA access units including all subsequent access units up to but not including any subsequent IDR or BLA access unit.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. An HEVC decoder can recognize an intra picture starting an open GOP, because a specific NAL unit type, CRA NAL unit type, is used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP starts from an IDR access unit. In HEVC a closed GOP may also start from a BLA_W_DLP or a BLA_N_LP picture. As a result, closed GOP structure has more error resilience potential in comparison to the open GOP structure, however at the cost of possible reduction in the compression efficiency. Open GOP coding structure is potentially more efficient in the compression, due to a larger flexibility in selection of reference pictures.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC.

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control may require the presence of memory management control operation (MMCO) parameters in the bitstream. MMCO parameters may be included in a decoded reference picture marking syntax structure. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

In the HEVC standard, reference picture marking syntax structures and related decoding processes are not used, but instead a reference picture set (RPS) syntax structure and decoding process are used instead for a similar purpose. A reference picture set valid or active for a picture includes all the reference pictures used as reference for the picture and all the reference pictures that are kept marked as "used for reference" for any subsequent pictures in decoding order. There are six subsets of the reference picture set, which are referred to as namely RefPicSetStCurr0, RefPicSetStCurr1, RefPicSetStFoll0, RefPicSetStFoll1, RefPicSetLtCurr, and RefPicSetLtFoll. The notation of the six subsets is as follows. "Curr" refers to reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In the HEVC standard, a reference picture set may be specified in a sequence parameter set and taken into use in the slice header through an index to the reference picture set. A reference picture set may also be specified in a slice header. A long-term subset of a reference picture set is generally specified only in a slice header, while the short-term subsets of the same reference picture set may be specified in the picture parameter set or slice header. A reference picture set may be coded independently or may be predicted from another reference picture set (known as inter-RPS prediction). When a reference picture set is independently coded, the syntax structure includes up to three loops iterating over different types of reference pictures; short-term reference pictures with lower POC value than the current picture, short-term reference pictures with higher POC value than the current picture and long-term reference pictures. Each loop entry specifies a picture to be marked as "used for reference". In general, the picture is specified with a differential POC value. The inter-RPS prediction exploits the fact that the reference picture set of the current picture can be predicted from the reference picture set of a previously decoded picture. This is because all the reference pictures of the current picture are either reference pictures of the previous picture or the previously decoded picture itself. It is only necessary to indicate which of these pictures should be reference pictures and be used for the prediction of the current picture. In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

A reference picture list, such as reference picture list 0 and reference picture list 1, is typically constructed in two steps: First, an initial reference picture list is generated. The initial reference picture list may be generated for example on the basis of frame_num, POC, temporal_id, or information on the prediction hierarchy such as GOP structure, or any combination thereof. Second, the initial reference picture list may be reordered by reference picture list reordering (RPLR) commands, also known as reference picture list modification syntax structure, which may be contained in slice headers. The RPLR commands indicate the pictures that are ordered to the beginning of the respective reference picture list. This second step may also be referred to as the reference picture list modification process, and the RPLR commands may be included in a reference picture list modification syntax structure. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. The initial reference picture lists may be modified through the reference picture list modification syntax structure, where pictures in the initial reference picture lists may be identified through an entry index to the list.

A way of categorizing different types of prediction that may be applied in video encoding and/or video decoding is to consider whether prediction applies to sample values or (de)coding parameters.

In the sample prediction, pixel or sample values in a certain picture area or "block" are predicted. These pixel or sample values can be predicted, for example, using one or more of the following ways:

Motion compensation mechanisms (which may also be referred to as temporal prediction or motion-compensated temporal prediction or motion-compensated prediction or MCP), which involve finding and indicating an area in one of the previously encoded video frames that corresponds closely to the block being coded.

Inter-view prediction, which involves finding and indicating an area in one of the previously encoded view components that corresponds closely to the block being coded.

View synthesis prediction, which involves synthesizing a prediction block or image area where a prediction block is derived on the basis of reconstructed/decoded ranging information.

Inter-layer prediction using reconstructed/decoded samples, such as the so-called IntraBL (base layer) mode of SVC.

Inter-layer residual prediction, in which for example the coded residual of a reference layer or a derived residual from a difference of a reconstructed/decoded reference layer picture and a corresponding reconstructed/decoded enhancement layer picture may be used for predicting a residual block of the current enhancement layer block. A residual block may be added for example to a motion-compensated prediction block to obtain a final prediction block for the current enhancement layer block. Residual prediction may sometimes be treated as a separate type of prediction in addition to sample and syntax prediction.

Intra prediction, where pixel or sample values can be predicted by spatial mechanisms which involve finding and indicating a spatial region relationship.

In the syntax prediction, which may also be referred to as parameter prediction, syntax elements and/or syntax element values and/or variables derived from syntax elements are predicted from syntax elements (de)coded earlier and/or variables derived earlier. Non-limiting examples of syntax prediction are provided below:

In motion vector prediction, motion vectors e.g. for inter and/or inter-view prediction may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in temporal reference pictures and signalling the chosen candidate as the motion vector predictor. In addition to predicting the motion vector values, the reference index of a previously coded/decoded picture can be predicted. The reference index may be predicted from adjacent blocks and/or co-located blocks in temporal reference picture. Differential coding of motion vectors may be disabled across slice boundaries.

The block partitioning, e.g. from CTU to CUs and down to PUs, may be predicted.

In filter parameter prediction, the filtering parameters e.g. for sample adaptive offset may be predicted.

Another way of categorizing different types of prediction that may be applied in video encoding and/or video decoding is to consider across which domains or scalability types the prediction crosses. This categorization may lead into one or more of the following types of prediction, which may also sometimes be referred to as prediction directions:

Temporal prediction e.g. of sample values or motion vectors from an earlier picture usually of the same scalability layer, view and component type (texture or depth).

Inter-view prediction (which may be also referred to as cross-view prediction) referring to prediction taking place between view components usually of the same time instant or access unit and the same component type.

Inter-layer prediction referring to prediction taking place between layers usually of the same time instant, of the same component type, and of the same view.

Inter-component prediction may be defined to comprise prediction of syntax element values, sample values, variable values used in the decoding process, or anything alike from a component picture of one type to a component picture of another type. For example, inter-component prediction may comprise prediction of a texture view component from a depth view component, or vice versa.

Prediction approaches using image information from a previously coded image can also be called as inter prediction methods. Inter prediction may sometimes be considered to only include motion-compensated temporal prediction, while it may sometimes be considered to include all types of prediction where a reconstructed/decoded block of samples is used as prediction source, therefore including conventional inter-view prediction for example. Inter prediction may be considered to comprise only sample prediction but it may alternatively be considered to comprise both sample and syntax prediction. As a result of syntax and sample prediction, a predicted block of pixels of samples may be obtained.

Prediction approaches using image information within the same image can also be called as intra prediction methods. Intra prediction may be considered to comprise only sample prediction but it may alternatively be considered to comprise both sample and syntax prediction.

If the prediction, such as predicted variable values and/or prediction blocks, is not refined by the encoder using any form of prediction error or residual coding, prediction may be referred to as inheritance.

A coding technique known as isolated regions is based on constraining in-picture prediction and inter prediction jointly. An isolated region in a picture can contain any macroblock (or alike) locations, and a picture can contain zero or more isolated regions that do not overlap. A leftover region, if any, is the area of the picture that is not covered by any isolated region of a picture. When coding an isolated region, at least some types of in-picture prediction is disabled across its boundaries. A leftover region may be predicted from isolated regions of the same picture.

A coded isolated region can be decoded without the presence of any other isolated or leftover region of the same coded picture. It may be necessary to decode all isolated regions of a picture before the leftover region. In some implementations, an isolated region or a leftover region contains at least one slice.

Pictures, whose isolated regions are predicted from each other, may be grouped into an isolated-region picture group. An isolated region can be inter-predicted from the corresponding isolated region in other pictures within the same isolated-region picture group, whereas inter prediction from other isolated regions or outside the isolated-region picture group may be disallowed. A leftover region may be inter-predicted from any isolated region. The shape, location, and size of coupled isolated regions may evolve from picture to picture in an isolated-region picture group.

Coding of isolated regions in the H.264/AVC codec may be based on slice groups. The mapping of macroblock locations to slice groups may be specified in the picture parameter set. The H.264/AVC syntax includes syntax to code certain slice group patterns, which can be categorized into two types, static and evolving. The static slice groups stay unchanged as long as the picture parameter set is valid, whereas the evolving slice groups can change picture by picture according to the corresponding parameters in the picture parameter set and a slice group change cycle parameter in the slice header. The static slice group patterns include interleaved, checkerboard, rectangular oriented, and freeform. The evolving slice group patterns include horizontal wipe, vertical wipe, box-in, and box-out. The rectangular oriented pattern and the evolving patterns are especially suited for coding of isolated regions and are described more carefully in the following.

For a rectangular oriented slice group pattern, a desired number of rectangles are specified within the picture area. A foreground slice group includes the macroblock locations that are within the corresponding rectangle but excludes the macroblock locations that are already allocated by slice groups specified earlier. A leftover slice group contains the macroblocks that are not covered by the foreground slice groups.

An evolving slice group is specified by indicating the scan order of macroblock locations and the change rate of the size of the slice group in number of macroblocks per picture. Each coded picture is associated with a slice group change cycle parameter (conveyed in the slice header). The change cycle multiplied by the change rate indicates the number of macroblocks in the first slice group. The second slice group contains the rest of the macroblock locations.

In H.264/AVC, in-picture prediction is disabled across slice group boundaries, because slice group boundaries lie in slice boundaries. Therefore each slice group is an isolated region or leftover region.

Each slice group has an identification number within a picture. Encoders can restrict the motion vectors in a way that they only refer to the decoded macroblocks belonging to slice groups having the same identification number as the slice group to be encoded. Encoders should take into account the fact that a range of source samples is needed in fractional pixel interpolation and all the source samples should be within a particular slice group.

The H.264/AVC codec includes a deblocking loop filter. Loop filtering is applied to each 4×4 block boundary, but loop filtering can be turned off by the encoder at slice boundaries. If loop filtering is turned off at slice boundaries, perfect reconstructed pictures at the decoder can be achieved when performing gradual random access. Otherwise, reconstructed pictures may be imperfect in content even after the recovery point.

The recovery point SEI message and the motion constrained slice group set SEI message of the H.264/AVC standard can be used to indicate that some slice groups are coded as isolated regions with restricted motion vectors. Decoders may utilize the information for example to achieve faster random access or to save in processing time by ignoring the leftover region.

A sub-picture concept has been proposed for HEVC e.g. in document JCTVC-O0356<http://phenix.int-evry.fr/jct/doc_end_user/documents/9_Geneva/wg11/JCTVC-I0356-v1.zip>, which is similar to rectangular isolated regions or rectangular motion-constrained slice group sets of h.264/AVC. The sub-picture concept proposed in JCTVC-I0356 is described in the following, while it should be understood that sub-pictures may be defined otherwise similarly but not identically to what is described below. In the sub-picture concept, the picture is partitioned into predefined rectangular regions. Each sub-picture would be processed as an independent picture except that all sub-pictures constituting a picture share the same global information such as SPS, PPS and reference picture sets. Sub-pictures are similar to tiles geometrically. Their properties are as follows: They are LCU-aligned rectangular regions specified at sequence level. Sub-pictures in a picture may be scanned in sub-picture raster scan of the picture. Each sub-picture starts a new slice. If multiple tiles are present in a picture, sub-picture boundaries and tiles boundaries may be aligned. There may be no loop filtering across sub-pictures. There may be no prediction of sample value and motion info outside the sub-picture, and no sample value at a fractional sample position that is derived using one or more sample values outside the sub-picture may be used to inter predict any sample within the sub-picture. If motion vectors point to regions outside of a sub-picture, a padding process defined for picture boundaries may be applied. LCUs are scanned in raster order within sub-pictures unless a sub-picture contains more than one tile. Tiles within a sub-picture are scanned in tile raster scan of the sub-picture. Tiles cannot cross sub-picture boundaries except for the default one tile per picture case. All coding mechanisms that are available at picture level are supported at sub-picture level.

In the HEVC, several improvements have been made to enable the codec to better utilize parallelism, i.e. parallel processing of encoding and/or decoding tasks, thus more efficiently utilizing modern multi-core processor architectures. While slices in principle can be used to parallelize the decoder, employing slices for parallelism typically results in relatively poor coding efficiency. The concept of wavefront processing has been introduced to HEVC to improve the utilization of parallelism.

To enable wavefront processing, the encoder and/or decoder uses the CABAC state of the second CTU of the previous CTU row as the initial CABAC state of the current CTU row. Hence, the processing of the current CTU row can be started when the processing of the second CTU of the previous CTU has been finished. Thanks to this property, CTU rows can be processed in a parallel fashion. In general, it may be pre-defined e.g. in a coding standard which CTU is used for transferring the entropy (de)coding state of the previous row of CTUs or it may be determined and indicated in the bitstream by the encoder and/or decoded from the bitstream by the decoder.

The wavefront processing in HEVC may be used in two parallelization approaches, Wavefront Parallel Processing (WPP) and Overlapped Wavefront (OWF). WPP allows creating picture partitions that can be processed in parallel without incurring high coding losses.

WPP processes rows of coding tree units (CTU) in parallel while preserving all coding dependencies. In WPP, entropy coding, predictive coding as well as in-loop filtering can be applied in a single processing step, which makes the implementations of WPP rather straightforward. OWF, in turn, enables to overlap the execution of consecutive pictures. When the processing of a coding tree unit row in the current picture has been finished and no more rows are available, the processing of the next picture can be started instead of waiting for the current picture to finish.

When a coded picture has been constrained for wavefront processing or when tiles have been used, CTU rows or tiles (respectively) may be byte-aligned in the bitstream and may be preceded by a start code. Additionally, entry points may be provided in the bitstream (e.g. in the slice header) and/or externally (e.g. in a container file). An entry point is a byte pointer or a byte count or a similar straightforward reference mechanism to the start of a CTU row (for wavefront-enabled coded pictures) or a tile. In HEVC, entry points may be specified using entry_point_offset_minus1[i] of the slice header. In the HEVC file format (ISO/IEC 14496-15), the sub-sample information box may provide the information of entry points. In some scenarios, the use of dependent slice segments may be useful instead of or in addition to entry points. A dependent slice segment may be formed for example for a CTU row when a coded picture is constrained for wavefront processing and consequently the start of the dependent slice segment NAL unit may be used to determine CTU row boundaries.

Scalable video coding refers to coding structure where one bitstream can contain multiple representations of the content at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance the temporal resolution (i.e., the frame rate), the spatial resolution, or simply the quality of the video content represented by another layer or part thereof. Each layer together with all its dependent layers is one representation of the video signal at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Some coding standards allow creation of scalable bit streams. A meaningful decoded representation can be produced by decoding only certain parts of a scalable bit stream. Scalable bit streams can be used for example for rate adaptation of pre-encoded unicast streams in a streaming server and for transmission of a single bit stream to terminals having different capabilities and/or with different network conditions. A list of some other use cases for scalable video coding can be found in the ISO/IEC JTC1 SC29 WG11 (MPEG) output document N5540, "Applications and Requirements for Scalable Video Coding", the 64th MPEG meeting, Mar. 10 to 14, 2003, Pattaya, Thailand.

In some cases, data in an enhancement layer can be truncated after a certain location, or even at arbitrary positions, where each truncation position may include additional data representing increasingly enhanced visual quality. Such scalability is referred to as fine-grained (granularity) scalability (FGS).

SVC uses an inter-layer prediction mechanism, wherein certain information can be predicted from layers other than the currently reconstructed layer or the next lower layer. Information that could be inter-layer predicted includes intra texture, motion and residual data. Inter-layer motion prediction includes the prediction of block coding mode, header information, etc., wherein motion from the lower layer may be used for prediction of the higher layer. In case of intra coding, a prediction from surrounding macroblocks or from co-located macroblocks of lower layers is possible. These prediction techniques do not employ information from earlier coded access units and hence, are referred to as intra prediction techniques. Furthermore, residual data from lower layers can also be employed for prediction of the current layer.

Scalable video (de)coding may be realized with a concept known as single-loop decoding, where decoded reference pictures are reconstructed only for the highest layer being decoded while pictures at lower layers may not be fully decoded or may be discarded after using them for inter-layer prediction. In single-loop decoding, the decoder performs motion compensation and full picture reconstruction only for the scalable layer desired for playback (called the "desired layer" or the "target layer"), thereby reducing decoding complexity when compared to multi-loop decoding. All of the layers other than the desired layer do not need to be fully decoded because all or part of the coded picture data is not needed for reconstruction of the desired layer.

However, lower layers (than the target layer) may be used for inter-layer syntax or parameter prediction, such as inter-layer motion prediction. Additionally or alternatively, lower layers may be used for inter-layer intra prediction and hence intra-coded blocks of lower layers may have to be decoded. Additionally or alternatively, inter-layer residual prediction may be applied, where the residual information of the lower layers may be used for decoding of the target layer and the residual information may need to be decoded or reconstructed. In some coding arrangements, a single decoding loop is needed for decoding of most pictures, while a second decoding loop may be selectively applied to reconstruct so-called base representations (i.e. decoded base layer pictures), which may be needed as prediction references but not for output or display.

SVC allows the use of single-loop decoding. It is enabled by using a constrained intra texture prediction mode, whereby the inter-layer intra texture prediction can be applied to macroblocks (MBs) for which the corresponding block of the base layer is located inside intra-MBs. At the same time, those intra-MBs in the base layer use constrained intra-prediction (e.g., having the syntax element "constrained_intra_pred_flag" equal to 1). In single-loop decoding, the decoder performs motion compensation and full picture reconstruction only for the scalable layer desired for playback (called the "desired layer" or the "target layer"), thereby greatly reducing decoding complexity. All of the layers other than the desired layer do not need to be fully decoded because all or part of the data of the MBs not used for inter-layer prediction (be it inter-layer intra texture prediction, inter-layer motion prediction or inter-layer residual prediction) is not needed for reconstruction of the desired layer.

A single decoding loop is needed for decoding of most pictures, while a second decoding loop is selectively applied to reconstruct the base representations, which are needed as prediction references but not for output or display, and are reconstructed only for the so called key pictures (for which "store_ref_base_pic_flag" is equal to 1).

FGS was included in some draft versions of the SVC standard, but it was eventually excluded from the final SVC standard. FGS is subsequently discussed in the context of some draft versions of the SVC standard. The scalability provided by those enhancement layers that cannot be truncated is referred to as coarse-grained (granularity) scalability (CGS). It collectively includes the traditional quality (SNR) scalability and spatial scalability. The SVC standard supports the so-called medium-grained scalability (MGS), where quality enhancement pictures are coded similarly to SNR scalable layer pictures but indicated by high-level syntax elements similarly to FGS layer pictures, by having the quality_id syntax element greater than 0.

The scalability structure in the SVC draft may be characterized by three syntax elements: "temporal_id," "dependency_id" and "quality_id." The syntax element "temporal_id" is used to indicate the temporal scalability hierarchy or, indirectly, the frame rate. A scalable layer representation comprising pictures of a smaller maximum "temporal_id" value has a smaller frame rate than a scalable layer representation comprising pictures of a greater maximum "temporal_id". A given temporal layer typically depends on the lower temporal layers (i.e., the temporal layers with smaller "temporal_id" values) but does not depend on any higher temporal layer. The syntax element "dependency_id" is used to indicate the CGS inter-layer coding dependency hierarchy (which, as mentioned earlier, includes both SNR and spatial scalability). At any temporal level location, a picture of a smaller "dependency_id" value may be used for inter-layer prediction for coding of a picture with a greater "dependency_id" value. The syntax element "quality_id" is used to indicate the quality level hierarchy of a FGS or MGS layer. At any temporal location, and with an identical "dependency_id" value, a picture with "quality_id" equal to QL uses the picture with "quality_id" equal to QL-1 for inter-layer prediction. A coded slice with "quality_id" larger than 0 may be coded as either a truncatable FGS slice or a non-truncatable MGS slice.

For simplicity, all the data units (e.g., Network Abstraction Layer units or NAL units in the SVC context) in one access unit having identical value of "dependency_id" are referred to as a dependency unit or a dependency representation. Within one dependency unit, all the data units having identical value of "quality_id" are referred to as a quality unit or layer representation.

A base representation, also known as a decoded base picture, is a decoded picture resulting from decoding the Video Coding Layer (VCL) NAL units of a dependency unit having "quality_id" equal to 0 and for which the "store_ref_base_pic_flag" is set equal to 1. An enhancement representation, also referred to as a decoded picture, results from the regular decoding process in which all the layer representations that are present for the highest dependency representation are decoded.

As mentioned earlier, CGS includes both spatial scalability and SNR scalability. Spatial scalability is initially designed to support representations of video with different resolutions. For each time instance, VCL NAL units are coded in the same access unit and these VCL NAL units can correspond to different resolutions. During the decoding, a low resolution VCL NAL unit provides the motion field and residual which can be optionally inherited by the final decoding and reconstruction of the high resolution picture. When compared to older video compression standards, SVC's spatial scalability has been generalized to enable the base layer to be a cropped and zoomed version of the enhancement layer.

MGS quality layers are indicated with "quality_id" similarly as FGS quality layers. For each dependency unit (with the same "dependency_id"), there is a layer with "quality_id" equal to 0 and there can be other layers with "quality_id" greater than 0. These layers with "quality_id" greater than 0 are either MGS layers or FGS layers, depending on whether the slices are coded as truncatable slices.

In the basic form of FGS enhancement layers, only inter-layer prediction is used. Therefore, FGS enhancement layers can be truncated freely without causing any error propagation in the decoded sequence. However, the basic form of FGS suffers from low compression efficiency. This issue arises because only low-quality pictures are used for inter prediction references. It has therefore been proposed that FGS-enhanced pictures be used as inter prediction references. However, this may cause encoding-decoding mismatch, also referred to as drift, when some FGS data are discarded.

One feature of a draft SVC standard is that the FGS NAL units can be freely dropped or truncated, and a feature of the SVCV standard is that MGS NAL units can be freely dropped (but cannot be truncated) without affecting the conformance of the bitstream. As discussed above, when those FGS or MGS data have been used for inter prediction reference during encoding, dropping or truncation of the data would result in a mismatch between the decoded pictures in the decoder side and in the encoder side. This mismatch is also referred to as drift.

To control drift due to the dropping or truncation of FGS or MGS data, SVC applied the following solution: In a certain dependency unit, a base representation (by decoding only the CGS picture with "quality_id" equal to 0 and all the dependent-on lower layer data) is stored in the decoded picture buffer. When encoding a subsequent dependency unit with the same value of "dependency_id," all of the NAL units, including FGS or MGS NAL units, use the base representation for inter prediction reference. Consequently, all drift due to dropping or truncation of FGS or MGS NAL units in an earlier access unit is stopped at this access unit. For other dependency units with the same value of "dependency_id," all of the NAL units use the decoded pictures for inter prediction reference, for high coding efficiency.

Each NAL unit includes in the NAL unit header a syntax element "use_ref_base_pic_flag." When the value of this element is equal to 1, decoding of the NAL unit uses the base representations of the reference pictures during the inter prediction process. The syntax element "store_ref_base_pic_flag" specifies whether (when equal to 1) or not (when equal to 0) to store the base representation of the current picture for future pictures to use for inter prediction.

NAL units with "quality_id" greater than 0 do not contain syntax elements related to reference picture lists construction and weighted prediction, i.e., the syntax elements "num_ref_active_lx_minus1" (x=0 or 1), the reference picture list reordering syntax table, and the weighted prediction syntax table are not present. Consequently, the MGS or FGS layers have to inherit these syntax elements from the NAL units with "quality_id" equal to 0 of the same dependency unit when needed.

In SVC, a reference picture list consists of either only base representations (when "use_ref_base_pic_flag" is equal to 1) or only decoded pictures not marked as "base representation" (when "use_ref_base_pic_flag" is equal to 0), but never both at the same time.

A scalable nesting SEI message has been specified in SVC. The scalable nesting SEI message provides a mechanism for associating SEI messages with subsets of a bitstream, such as indicated dependency representations or other scalable layers. A scalable nesting SEI message contains one or more SEI messages that are not scalable nesting SEI messages themselves. An SEI message contained in a scalable nesting SEI message is referred to as a nested SEI message. An SEI message not contained in a scalable nesting SEI message is referred to as a non-nested SEI message. A similar SEI message than the scalable nesting SEI message has been specified in MVC for indicating which views the nested SEI messages apply to. Another similar SEI message than the scalable nesting SEI message has been specified in the multiview and depth extension of H.264/AVC (also referred to as MVC+D) to specify which texture and/or depth views the nested SEI messages apply to. H.265/HEVC also includes a similar scalable nesting SEI message.

A scalable video codec for quality scalability (also known as Signal-to-Noise or SNR) and/or spatial scalability may be implemented as follows. For a base layer, a conventional non-scalable video encoder and decoder are used. The reconstructed/decoded pictures of the base layer are included in the reference picture buffer for an enhancement layer. In H.264/AVC, HEVC, and similar codecs using reference picture list(s) for inter prediction, the base layer decoded pictures may be inserted into a reference picture list(s) for coding/decoding of an enhancement layer picture similarly to the decoded reference pictures of the enhancement layer. Consequently, the encoder may choose a base-layer reference picture as inter prediction reference and indicate its use typically with a reference picture index in the coded bitstream. The decoder decodes from the bitstream, for example from a reference picture index, that a base-layer picture is used as inter prediction reference for the enhancement layer. When a decoded base-layer picture is used as prediction reference for an enhancement layer, it is referred to as an inter-layer reference picture.

In addition to quality scalability following scalability modes exist:

Spatial scalability: Base layer pictures are coded at a lower resolution than enhancement layer pictures.

Bit-depth scalability: Base layer pictures are coded at lower bit-depth (e.g. 8 bits) than enhancement layer pictures (e.g. 10 or 12 bits).

Chroma format scalability: Base layer pictures provide lower fidelity in chroma (e.g. coded in 4:2:0 chroma format) than enhancement layer pictures (e.g. 4:4:4 format).

Color gamut scalability, where the enhancement layer pictures have a richer/broader color representation range than that of the base layer pictures—for example the enhancement layer may have UHDTV (ITU-R BT.2020) color gamut and the base layer may have the ITU-R BT.709 color gamut.

View scalability, where different layers represent different views of multiview video.

Depth scalability, where certain layers may represent regular color video content and others may represent ranging information, disparity, depth, or alike.

Auxiliary picture scalability, where certain layers may represent auxiliary video content such as alpha planes, which may be used for example to indicate transparency or opacity information or for chroma keying.

In all of the above scalability cases, base layer information could be used to code enhancement layer to minimize the additional bitrate overhead.

Frame packing refers to a method where more than one frame is packed into a single frame at the encoder side as a pre-processing step for encoding and then the frame-packed frames are encoded with a conventional 2D video coding scheme. The output frames produced by the decoder therefore contain constituent frames of that correspond to the input frames spatially packed into one frame in the encoder side. Frame packing may be used for stereoscopic video, where a pair of frames, one corresponding to the left eye/camera/view and the other corresponding to the right eye/camera/view, is packed into a single frame. Frame packing may also or alternatively be used for depth or disparity enhanced video, where one of the constituent frames represents depth or disparity information corresponding to another constituent frame containing the regular color information (luma and chroma information). The use of frame-packing may be signaled in the video bitstream, for example using the frame packing arrangement SEI message of H.264/AVC or similar. The use of frame-packing may also or alternatively be indicated over video interfaces, such as High-Definition Multimedia Interface (HDMI). The use of frame-packing may also or alternatively be indicated and/or negotiated using various capability exchange and mode negotiation protocols, such as Session Description Protocol (SDP).

Available media file format standards include ISO base media file format (ISO/IEC 14496-12, which may be abbreviated ISOBMFF), MPEG-4 file format (ISO/IEC 14496-14, also known as the MP4 format), the file format for NAL-structured media (ISO/IEC 14496-15) and 3GPP file format (3GPP TS 26.244, also known as the 3GP format). ISO/IEC 14496-15 was originally developed as the file format for H.264/AVC. The SVC and MVC file formats are specified as amendments to the AVC file format. Lately, the support of HEVC was added to ISO/IEC 14496-15. The ISO file format is the base for derivation of all the above mentioned file formats (excluding the ISO file format itself). These file formats (including the ISO file format itself) are generally called the ISO family of file formats.

The basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are enclosed in separate boxes. In an example embodiment, the media data may be provided in a media data (mdat) box and the movie (moov) box may be used to enclose the metadata. In some cases, for a file to be operable, both of the mdat and moov boxes must be present. The movie (moov) box may include one or more tracks, and each track may reside in one corresponding track box. A track may be one of the following types: media, hint, timed metadata. A media track refers to samples formatted according to a media compression format (and its encapsulation to the ISO base media file format). A hint track refers to hint samples, containing cookbook instructions for constructing packets for transmission over an indicated communication protocol. The cookbook instructions may include guidance for packet header construction and include packet payload construction. In the packet payload construction, data residing in other tracks or items may be referenced. As such, for example, data residing in other tracks or items may be indicated by a reference as to which piece of data in a particular track or item is instructed to be copied into a packet during the packet construction process. A timed metadata track may refer to samples describing referred media and/or hint samples. For the presentation of one media type, typically one media track is selected. Samples of a track may be implicitly associated with sample numbers that are incremented by 1 in the indicated decoding order of samples. The first sample in a track may be associated with sample number 1.

An example of a simplified file structure according to the ISO base media file format may be described as follows. The file may include the moov box and the mdat box and the moov box may include one or more tracks that correspond to video and audio, respectively.

The ISO base media file format does not limit a presentation to be contained in one file. As such, a presentation may be comprised within several files. As an example, one file may include the metadata for the whole presentation and may thereby include all the media data to make the presentation self-contained. Other files, if used, may not be required to be formatted to ISO base media file format, and may be used to include media data, and may also include unused media data, or other information. The ISO base media file format concerns the structure of the presentation file only. The format of the media-data files may be constrained by the ISO base media file format or its derivative formats only in that the media-data in the media files is formatted as specified in the ISO base media file format or its derivative formats.

The ability to refer to external files may be realized through data references. In some examples, a sample description box included in each track may provide a list of sample entries, each providing detailed information about the coding type used, and any initialization information needed for that coding. All samples of a chunk and all samples of a track fragment may use the same sample entry. A chunk may be defined as a contiguous set of samples for one track. The Data Reference (dref) box, also included in each track, may define an indexed list of uniform resource locators (URLs), uniform resource names (URNs), and/or self-references to the file containing the metadata. A sample entry may point to one index of the Data Reference box, thereby indicating the file containing the samples of the respective chunk or track fragment.

Some video use cases may require extracting a part of a high resolution video. Such cases include, for example, zooming to a certain area in the video, following certain objects in the video or modifying or analyzing content in a limited area in a video sequence. The most straight-forward implementation of such use cases may involve decoding complete pictures and performing the desired operations on those. This kind of an approach results in high requirements on computational operations, increase in power consumption and slowdown in the processing.

As described above, tiles in H.265/HEVC and slices in H.265/HEVC and H.264/AVC, allow video encoders to create predefined picture areas that can be decoded independently from each other. The decoder may then select which tiles or slices it needs to decode in order to access the sample values of interest. One of the drawbacks of this approach is that the encoder needs to split the picture in a rigid grid of tiles or slices. The smaller the area of an individual tile or slice is, the more specific pixel areas can be decoded independently, but at the same time the coding efficiency is seriously degraded as the encoder cannot use the information from other slices or tiles to predict information in the current slice or tile or only a subset of the information from other slices or tiles may be allowed to be used to predict information in the current slice. Another drawback is that a decoder needs to typically decode significant amount of pixels outside the actual area of interest as it needs to decode all the slices and tiles that intersect with the area of interest.

Now in order to decode an area of interest within a video frame without the need for full decoding of unnecessary data outside said area, an improved method for carrying out a random access to such area within a video frame is introduced hereinafter.

Figure 5:
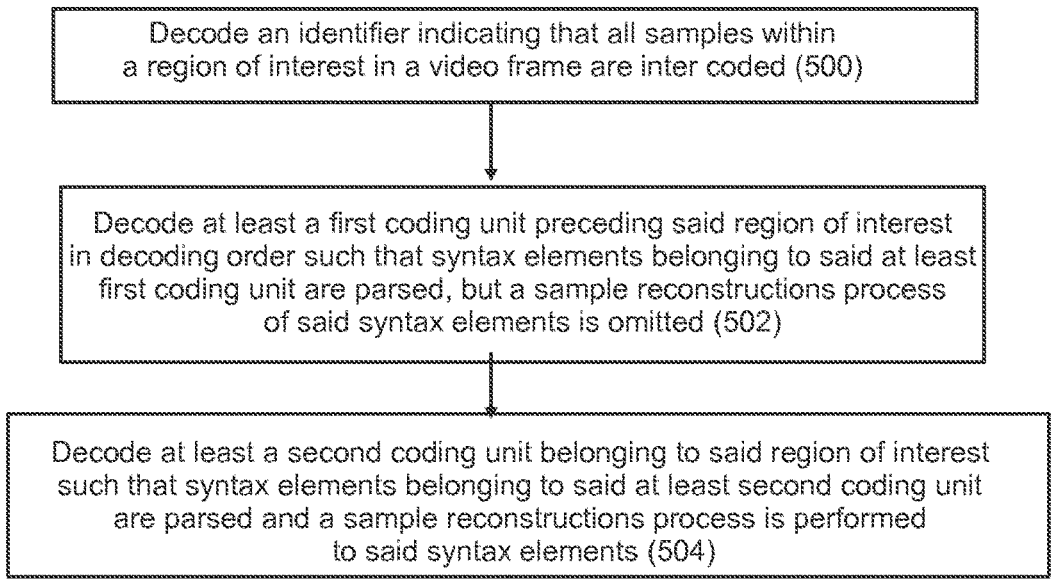
FIG. 5 shows a flow chart of a decoding process according to an embodiment of the invention.

In a method, which is disclosed in FIG. 5, an encoded video representation is decoded from a bitstream such that an identifier is decoded (500), the identifier indicating that all samples within a scope of the bitstream have been coded with a prediction restriction. It is determined (502) that the scope covers a region of interest within a picture. Then at least a first coding unit preceding said region of interest in decoding order is decoded (504) in a parse mode such that syntax elements belonging to said at least first coding unit are parsed, but a sample reconstruction process of said syntax elements is fully or partly omitted, and at least a second coding unit belonging to said region of interest is decoded (506) such that syntax elements belonging to said at least second coding unit are parsed and a sample reconstruction process is performed to said syntax elements.

According to an embodiment, said prediction restriction comprises one or more of the following:
- No intra coding has been used for the samples; No intra prediction has been used for the samples;
- No in-picture sample prediction has been used for the samples;
- No intra prediction across boundaries of an elementary unit of samples has been used;
- No in-picture sample prediction across boundaries of an elementary unit of samples has been used;
- Only prediction between pictures has been used for the samples.

An elementary unit of samples, as referred to above, may in different embodiments be for example one of the following:
- A coding tree unit (as in H.265/HEVC) or a macroblock (as in H.264/AVC) or alike;
- A coding unit (as in H.265/HEVC) or alike;
- A tile (as in H.265/HEVC), a slice group (as in H.264/AVC) or alike;
- A slice (such as a rectangular slice), or alike.

An elementary unit of samples may be used to infer the spatial granularity which the region of interest may be defined and/or a picture can be accessed according to different embodiments. For example, if the elementary unit of samples is a CTU, the region of interest may be defined to include certain CTUs and/or the picture may be accessed from any CTU.

In some embodiments, the elementary unit of samples may be pre-defined for example in a coding standard. In some embodiments, the elementary unit of samples may be indicated by the encoder or the file creator or alike in a bitstream or a file and decoded by the decoder or the file parser or alike from a bitstream or a file.

According to an embodiment, the method further comprises inferring or decoding the scope to be one or more of the following:
- the bitstream;
- inter-predicted pictures of the bitstream;
- at least one scalability layer within the bitstream;
- the picture;
- the region of interest.

Thus, fine granularity access is provided to sample values in an encoded video representation by limiting the usage of coding tools in restrictively coded pictures in a way that there are no spatial dependencies between sample values within a region of interest in a video frame and indicating this restriction in the bitstream. The decoder is configured to read the indication and then regenerate the coded sample values by only parsing the bitstream until the position representing the sample values of the region of interest and switching from parsing mode to full decoding mode to recover the sample data within the region of interest.

Figure 6:
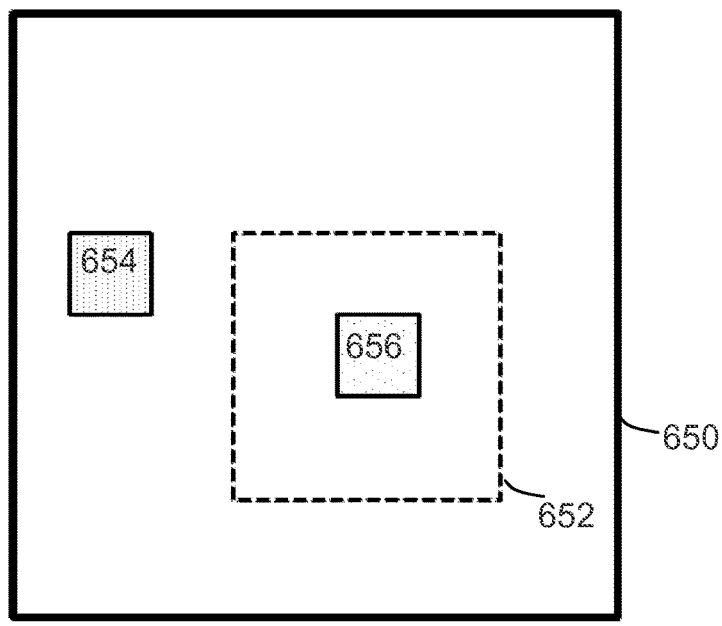
FIG. 6 shows an example of a decoding process according an embodiment of the invention.

An example of the decoding process is illustrated in FIG. 6, where a video frame 650 comprises a region of interest 652, in which the coding units belonging thereto are restrictively encoded, for example such that no intra coding within the region of interest is allowed. The region of interest represents the area in which the spatial random access is performed. The coding unit 654 is a coding unit preceding said region of interest in decoding order, and it is decoded in a parse mode such that syntax elements belonging to the coding unit 654 are parsed, but a sample reconstruction process of said syntax elements is omitted. The coding unit 656, in turn, is a coding unit belonging to said region of interest, and it is decoded in a full decoding mode such that syntax elements belonging to the coding unit 656 are parsed and a sample reconstruction process is performed to said syntax elements.

According to an embodiment, the decoder may select the first coding unit to be decoded in the parse mode, i.e. only parsed, and the decoder may omit the parsing and decoding of coding units preceding this first coding unit in decoding order.

According to an embodiment, the first coding unit to be decoded in the parse mode may be selected on the basis of whether slices, tiles and/or wavefronts have been used in encoding the coding units.

According to an embodiment, when no tiles or wavefronts have been used (or a single tile covers the entire picture), the first coding unit to be decoded in the parse mode may be the first coding unit of the slice that immediately precedes, in decoding order, the top-left coding unit of the area that is decoded in the full decoding mode. In other words, the latest slice, in decoding order, whose top-left coding unit is or precedes the top-left coding unit of the area to be decoded in the full decoding mode may be selected. The coding units to be decoded in the parse mode include the coding units of the slice, in decoding order, until the top-left coding unit of the area to be decoded in the full decoding mode, exclusive.

According to an embodiment, when wavefronts have been used, the first coding unit to be decoded in the parse mode may be the first coding unit of the CTU row containing the top-left coding unit of the area to be decoded in the full decoding mode. The decoder may locate the start of the coded data for a CTU row, for example, from entry points indicated in the bitstream or otherwise. For example, the decoder may use the entry_point_offset_minus1 [i] syntax element of H.265/HEVC. According to an embodiment, only the CTU rows with indicated entry points are considered in the determination of the first coding unit to be decoded in the parse mode.

According to an embodiment, when tiles have been used, the first coding unit to be decoded in the parse mode may be the first coding unit of the tile that immediately precedes, in decoding order, the top-left coding unit of the area that is decoded in the full decoding mode. The decoder may locate the start of the coded data for a tile, for example, from entry points indicated in the bitstream or otherwise. For example, the decoder may use the entry_point_offset_minus1 [i] syntax element of H.265/HEVC. According to an embodiment, only the tiles with indicated entry points are considered in the determination of the first coding unit to be decoded in the parse mode.

According to an embodiment, the decoder may select the coding units for which the parsing and the decoding is omitted on the basis of whether slices, tiles and/or wavefronts have been used in encoding the coding units.

According to an embodiment, when no tiles or wavefronts have been used and a slice is not even partially within the area to be decoded in the full decoding mode, the parsing and decoding of the slice may be omitted.

According to an embodiment, when wavefronts have been used and a CTU row is not even partially within the area to be decoded in the full decoding mode, the parsing and decoding of the CTU row may be omitted.

According to an embodiment, when tiles have been used and a tile is not even partially within the area to be decoded in the full decoding mode, the parsing and decoding of the tile may be omitted.

According to an embodiment, if a full decoding of a picture is desired, the decoder can run in the full decoding mode for a complete picture.

According to an embodiment, when the prediction restriction applies to an elementary unit of samples, such as a CTU, the full decoding mode is constrained to comply with the prediction restriction. For example, if the prediction restriction is to disallow intra prediction across the boundaries of a CTU, the full decoding mode is modified not to use samples outside a CTU for intra prediction of samples within the CTU. The described full decoding mode may be applied with other embodiments or may be applied independently with the following method or alike: An encoded video representation is decoded from a bitstream such that an identifier is decoded, the identifier indicating whether or not elementary units of samples within a scope of the bitstream have been coded with a prediction restriction. As response to the identifier indicating that elementary units of samples within the scope of the bitstream have been coded with a prediction restriction, omitting samples outside an elementary unit of samples within the scope in a prediction of the elementary unit of samples. As response to the identifier indicating that elementary units of samples within the scope of the bitstream have not been coded with a prediction restriction, using samples outside an elementary unit of samples within the scope in a prediction of the elementary unit of samples.

According to an embodiment, the region of interest that said identifier applies can be a complete video frame, a slice, a tile, a constituent picture in frame-packed video, or an area indicated in other ways.

Herein, the restrictively coded samples can refer to samples that have been predicted with temporal means, such as motion compensated prediction. According to an embodiment, in addition to indicating if all the samples within the region of interest in a video frame are restrictively coded, it may be further indicated that the in-loop filtering process (such as deblocking filter, SAO) are disabled for the region of interest. This disabling can be:
- None of the edges of certain type or types within the region of interest use in-loop filtering. For example, it may be indicated that in-loop filtering is not applied over any of the slice edges within the region of interest and/or any of the tile edges within the region of interest.
- Only the edges at the border of the region of interest are restricted for in-loop filtering.

According to an embodiment, the full decoding mode may involve a modified decoding process when only a region is decoded which is different than the standard compliant decoding. For example, the in-loop filtering of the edge pixels may be omitted since the pixels outside the region are not available. Alternatively, only the coding units at the border of the region of interest could be decoded in modified decoding mode.

Figure 7:
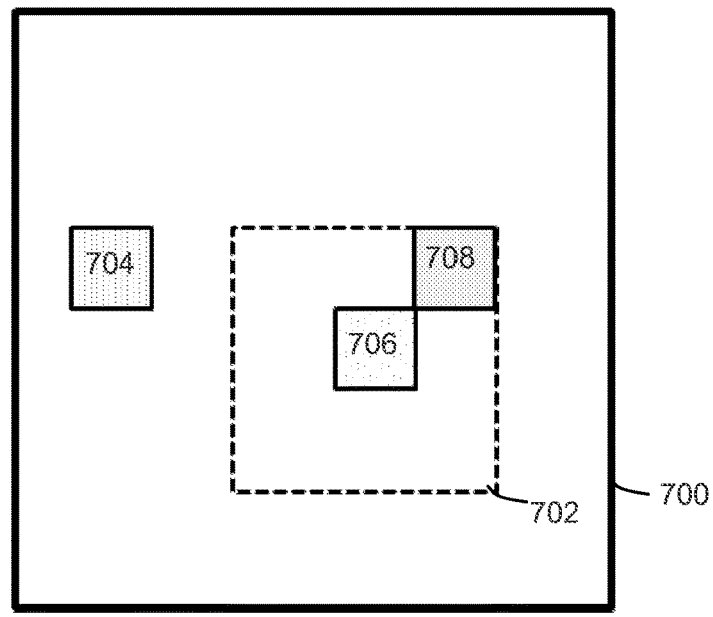
FIG. 7 shows an example of another decoding process according an embodiment of the invention.

An example of applying a modified decoding process for a region of interest is illustrated in FIG. 7. A video frame 700 comprises a region of interest 702, in which the coding units belonging thereto are restrictively encoded. The coding unit 704 is a coding unit preceding said region of interest in decoding order, and it is decoded in the parse mode. The coding unit 706, in turn, is a coding unit belonging to said region of interest, and it is decoded in the full decoding mode as described above. In this example, the modified decoding process has been defined such that only the coding units at the border of the region of interest are decoded in modified decoding mode. Thus, the coding unit 708 is a coding unit decoded in the modified decoding mode.

According to an embodiment, instead of indicating that all pixels within a region are inter coded, it may be indicated that none of the coding units at the border of the region of interest are intra coded, but the remaining coding units can be intra or inter coded.

Figure 8:
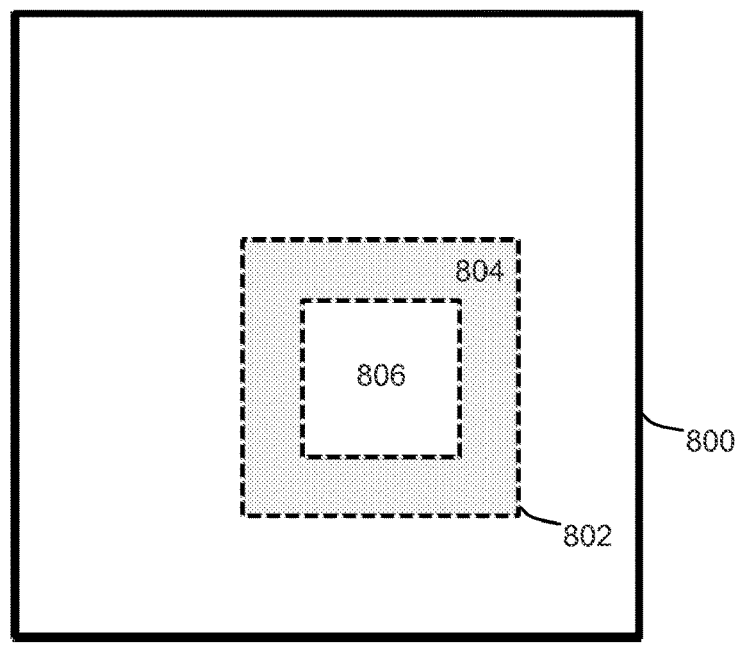
FIG. 8 shows an example of yet another decoding process according an embodiment of the invention.

FIG. 8 shows an example of coding units at the border of the region of interest not being intra coded. A video frame 800 comprises a region of interest 802, in which the coding units belonging thereto are restrictively encoded.

Different embodiments have been described with reference to phrases such as "all blocks have been inter predicted/coded" or "no intra coding has been used/allowed". It needs to be understood that embodiments could be similarly realized with other similar phrasing and by reference to certain types prediction/coding has been used for all blocks or no certain other types of prediction/coding has been used. For example, embodiments could be realized with reference to:
- No intra coding has been used
- No intra prediction has been used
- No in-picture sample prediction of any type has been used
- No intra prediction across LCU or CTU boundaries has been used (but intra prediction within an LCU or CTU may have been used)
- No in-picture sample prediction of any type across LCU or CTU boundaries has been used (but in-picture sample prediction within an LCU or CTU may have been used)
- Only prediction between pictures has been or is allowed to be used, where the prediction may be of any type including but not limited to:
  - Temporal prediction a.k.a. inter prediction a.k.a. intra-layer prediction
  - Inter-layer prediction
  - Inter-view prediction
  - Inter-component prediction e.g. from texture to depth or vice versa
- Only a specific type of prediction between pictures has been or is allowed to be used (e.g. one or more of the types above).

According to an embodiment, the encoder and/or the decoder may generate entropy decoding entry point (EDEP) data for at least one point or coding tree unit or coding unit of a coded picture (hereafter, EDEP). The EDEP data may enable starting of the parsing process from the EDEP. The EDEP data may include the contexts and the state of the entropy decoder at the EDEP. The EDEP data may also contain a pointer or another indicator to the location within the coded data, which may be for example capable of indicating the bit position of the EDEP within the coded picture. The format to store the EDEP data may be specified e.g. in a standard or may be proprietary. The EDEP data may be stored, for example, in a container file in an optional box and/or the EDEP data may be stored externally from the container file. The EDEP data may be generated, for example, when random access to a certain part of the picture is expected to be performed frequently, for example when a spatial region is used as a cover picture or similar for an image gallery or similar. The encoder and/or the decoder and/or the file generator and/or the file editor and/or the file parser/player may store the EDEP data.

According to an embodiment, the decoder may decode and use EDEP data similarly to entry points for CTU rows (when wavefronts have been used) or for tiles to select the first coding unit to be decoded in the parse mode. In other words, the first coding unit to be decoded in the parse mode may be either the EDEP or the first coding unit of the slice or tile or CTU row (when wavefronts have been used), whichever is later in decoding order, immediately preceding, in decoding order, the top-left coding unit of the area that is to be decoded in the full decoding mode.

According to an embodiment, when a bitstream or a file with EDEP data is copied or moved to another physical storage medium and/or to another file, the EDEP data may be removed in connection with said copying or moving. Similarly, if the bitstream or the file is transmitted, the EDEP data may be removed or omitted from the transmission. Consequently, in some embodiments the EDEP data may be regarded as metadata that helps speeding up and/or simplifies the random access to decoding a spatial region within a picture.

Figure 9:
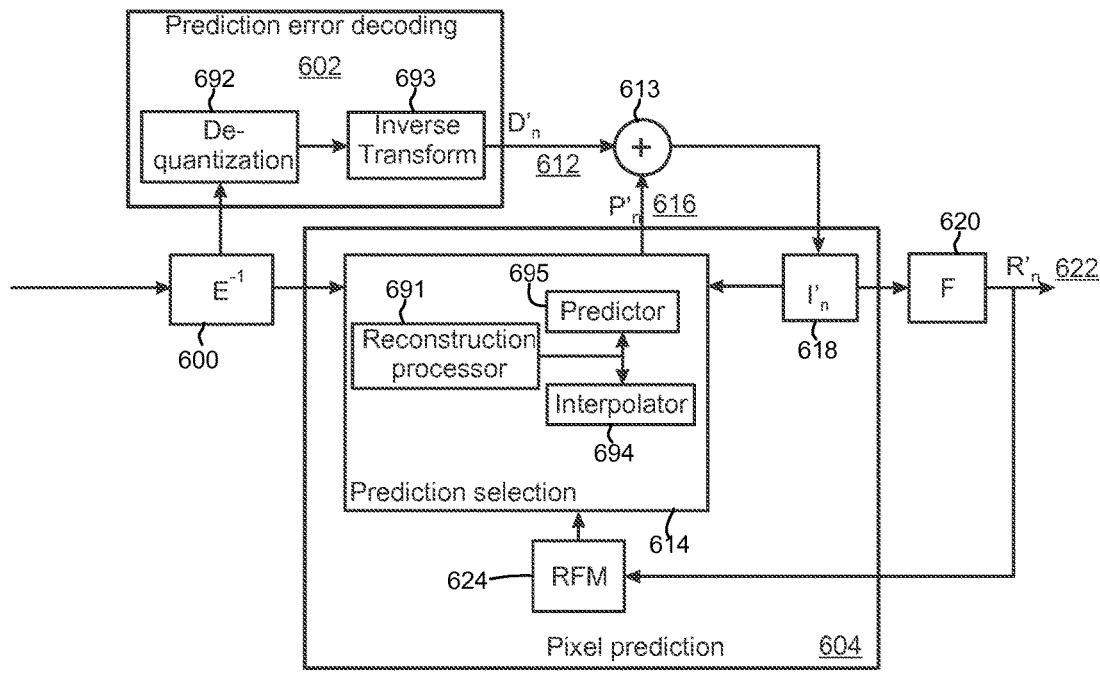
FIG. 9 shows a schematic diagram of a decoder according to some embodiments of the invention.

The above embodiments may be implemented in a decoder configured to decode an encoded video representation from a bitstream. FIG. 9 shows a block diagram of a video decoder suitable for employing embodiments of the invention.

A decoding process such as described in relation to FIG. 9 may be considered a sample reconstruction process in various embodiments. It should be understood that any process resulting in decoded sample or pixel values from a coded input signal, such as a bitstream, may be considered a sample reconstruction process. A sample reconstruction process may exclude entropy decoding.

The decoder includes an entropy decoder 600 which performs entropy decoding on the received signal as an inverse operation to the entropy encoder 330 of the encoder described above. The entropy decoder 600 outputs the results of the entropy decoding to a prediction error decoder 602 and pixel predictor 604.

The pixel predictor 604 receives the output of the entropy decoder 600. A predictor selector 614 within the pixel predictor 604 determines that an intra-prediction, an inter-prediction, or interpolation operation is to be carried out. The predictor selector may furthermore output a predicted representation of an image block 616 to a first combiner 613. The predicted representation of the image block 616 is used in conjunction with the reconstructed prediction error signal 612 to generate a preliminary reconstructed image 618. The preliminary reconstructed image 618 may be used in the predictor 614 or may be passed to a filter 620. The filter 620 applies a filtering which outputs a final reconstructed signal 622. The final reconstructed signal 622 may be stored in a reference frame memory 624, the reference frame memory 624 further being connected to the predictor 614 for prediction operations.

The prediction error decoder 602 receives the output of the entropy decoder 600. A dequantizer 692 of the prediction error decoder 602 may dequantize the output of the entropy decoder 600 and the inverse transform block 693 may perform an inverse transform operation to the dequantized signal output by the dequantizer 692. The output of the entropy decoder 600 may also indicate that prediction error signal is not to be applied and in this case the prediction error decoder produces an all zero output signal.

Figure 10:
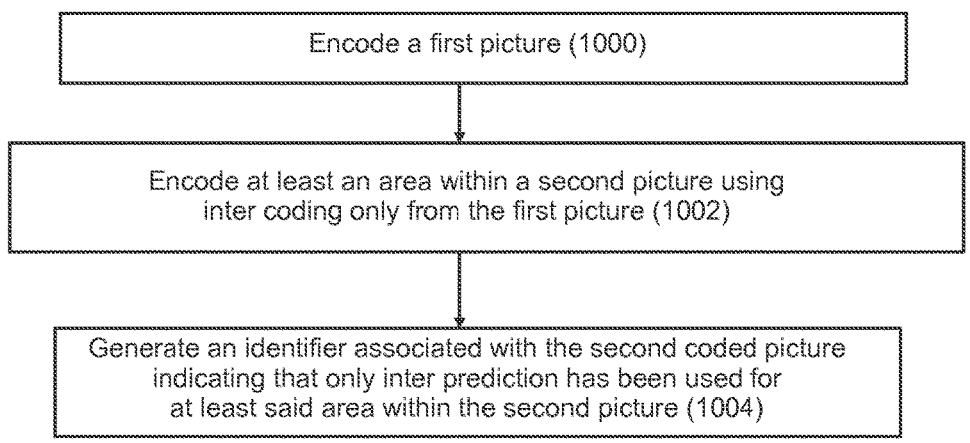
FIG. 10 shows a flow chart of an encoding process according to an embodiment of the invention.

Another aspect of the invention is the encoding operations, which are shown in FIG. 10. In the encoding process, which may be carried out for example in the encoder of FIG. 4, the encoder may encode (1000) a first picture and then encode (1002) at least an area within a second picture with a prediction restriction from the first picture (for example, intra prediction may be turned off in the encoding of said area in the second picture). The encoder then generates (1004) an identifier associated with the second coded picture indicating that said prediction restriction has been used for at least samples of said area within the second picture.

According to an embodiment, said prediction restriction comprises one or more of the following:
   No intra coding has been used for the samples;
   No intra prediction has been used for the samples;
   No in-picture sample prediction has been used for the samples;
   No intra prediction across boundaries of an elementary unit of samples has been used;
   No in-picture sample prediction across boundaries of an elementary unit of samples has been used;
   Only prediction between pictures has been used for the samples.

Thus, the encoder may implement a limited usage of coding tools, for example in inter coded pictures such that a region of interest is encoded without any spatial dependencies between sample values within a region of interest in a video frame, and the encoder indicates this restriction in the bitstream.

A video encoding process may include reconstruction of pictures for example through inverse quantization and inverse transform. Thus, a part of an encoding process may be considered a sample reconstruction process in various embodiments. It should be understood that any process(es) resulting in reconstructed sample or pixel values as part of an encoding process may be considered a sample reconstruction process. A sample reconstruction process may exclude entropy coding.

According to an embodiment, the encoder may include the identifier into and the decoder may decode the identifier from for example one or more of the following:
   A supplemental enhancement information (SEI) message
   A sequence parameter set (SPS)
   A picture parameter set (PPS)
   Video usability information (VUI)
   A container file format structure. In the context of the ISO Base Media File Format or its derivatives, such a file format structure may for example be a box included in the sample description entry indicated to be used for the corresponding pictures.

Additionally or alternatively, a file generator may generate the identifier and include the identifier into, for example, in one or more of the above-mentioned structures. Additionally or alternatively, a file parser or player may decode the identifier from, for example, one or more of the above-mentioned structures.

An example embodiment of including the identifier in ISO Base Media File Format or its derivatives is described next. The identifier may be included in an optional box, for example called CodingConstraintBox, which may be included in a sample entry, such as the HEVCSampleEntry structure for HEVC-coded tracks. CodingConstraintBox box may carry information that is helpful for a player to adjust its operation when decoding HEVC video or image sequences.

The syntax of the CodingConstraintBox may be for example like the following. The syntax element NoIntraPredInRefPics corresponds to the identifier in different embodiments.

```
class CodingConstraintsBox extends FullBox('ccst', version = 0, 0){
    unsigned int (1) IntraOnlyFlag;
    unsigned int (1) AllReferencePicturesIntra;
    unsigned int (1) NoIntraPredInRefPics;
    unsigned int(29) ReservedFlags;
    Box( ); // zero or more reserved boxes
}
```

The semantics of the syntax elements in the CodingConstraintsBox may be specified for example as follows.

IntraOnlyFlag: If this flag is set to one it indicates that all samples in the track are intra coded. If this flag is set to zero it is an indication that there may be pictures in the track that are predicted from other pictures.

AllReferencePicturesIntra: This flag when set to one indicates the restriction that if there are inter predicted pictures in the track, then these pictures are all predicted from intra coded pictures.

NoIntraPredInRefPics: This flag, when set to one, indicates that no intra prediction has been used in any inter-predicted pictures. When this flag is set to zero, intra prediction may or may not have been used in inter-predicted pictures.

It may additionally be specified that if IntraOnlyFlag is equal to 1, the semantics of AllReferencePicturesIntra and NoIntraPredInRefPics are reserved or unspecified.

The identifier according to the various embodiments may be indicated in or along a bitstream or a file with one or more indications, which may be coded as one or more syntax elements or syntax element values in one or more syntax structures. The encoder may encode the indication(s) in the bitstream. The decoder may decode the indication(s) from the bitstream.

The syntax structure may determine the scope or validity or persistence of the indication(s). For example, if the indication resides in a sequence parameter set, the indication(s) can in some embodiments be valid for the coded video sequence for which the sequence parameter set is active. Likewise, if the indication resides in a picture parameter set, it may be valid for the picture for which the picture parameter set is active. Alternatively, the scope/validity/persistence of the indication(s) may be included in the indication(s) or other syntax elements associated with indication(s). In some embodiments, the scope or validity or persistence of the indication(s) may include a set of layers. In some embodiments, the scope or validity or persistence of the indication(s) may include a set of scalability dimensions, such as a set of views, a set of component types (e.g. texture and/or depth) and/or a set of scalability layers (e.g. spatial and/or quality scalability layers).

In some embodiments, there may be more than one identifier, applying for example for different parts of the bitstream. For example, one identifier may apply for the base layer and another identifier for an enhancement layer. In a second example, one identifier applies for a first picture and a second identifier for a second picture. Each identifier or a set of identifier may be may be indicated in or along a bitstream or a file with one or more indications, which may be coded as one or more syntax elements or syntax element values in one or more syntax structures. The indication(s) may be handled similarly to as described above.

In the above, some embodiments have been described in relation to encoding indications, syntax elements, and/or syntax structures into a bitstream or into a coded video sequence and/or decoding indications, syntax elements, and/or syntax structures from a bitstream or from a coded video sequence. It needs to be understood, however, that embodiments could be realized when encoding indications, syntax elements, and/or syntax structures into a syntax structure or a data unit that is external from a bitstream or a coded video sequence comprising video coding layer data, such as coded slices, and/or decoding indications, syntax elements, and/or syntax structures from a syntax structure or a data unit that is external from a bitstream or a coded video sequence comprising video coding layer data, such as coded slices.

For example, in some embodiments, an indication according to any embodiment above may be coded into a video parameter set or a sequence parameter set, which is conveyed externally from a coded video sequence for example using a control protocol, such as SDP. Continuing the same example, a receiver may obtain the video parameter set or the sequence parameter set, for example using the control protocol, and provide the video parameter set or the sequence parameter set for decoding.

Figure 11:
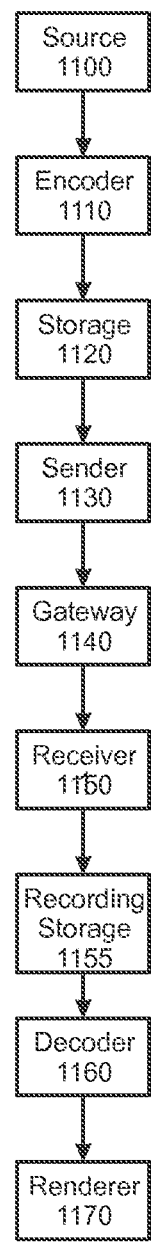
FIG. 11 shows an example of a generic multimedia communication system suitable for implementing some embodiments of the invention.

FIG. 11 is a graphical representation of an example of a generic multimedia communication system within which various embodiments may be implemented. As shown in FIG. 11, a data source 1100 provides a source signal in an analog, uncompressed digital, or compressed digital format, or any combination of these formats. An encoder 1110 encodes the source signal into a coded media bitstream. It should be noted that a bitstream to be decoded can be received directly or indirectly from a remote device located within virtually any type of network. Additionally, the bitstream can be received from local hardware or software. The encoder 1110 may be capable of encoding more than one media type, such as audio and video, or more than one encoder 1110 may be required to code different media types of the source signal. The encoder 1110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in FIG. 11 only one encoder 1110 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream is transferred to a storage 1120. The storage 1120 may comprise any type of mass memory to store the coded media bitstream. The format of the coded media bitstream in the storage 1120 may be an elementary self-contained bitstream format, or one or more coded media bitstreams may be encapsulated into a container file. The encoder 1110 and/or the storage 1120 may include or may be connected with a file generator or creator inputting media bitstrams and encapsulating them into a container file. Some systems operate "live", i.e. omit storage and transfer coded media bitstream from the encoder 1110 directly to the sender 1130. The coded media bitstream is then transferred to the sender 1130, also referred to as the server, on a need basis. The format used in the transmission may be an elementary self-contained bitstream format, a packet stream format, or one or more coded media bitstreams may be encapsulated into a container file. The encoder 1110, the storage 1120, and the sender 1130 may reside in the same physical device or they may be included in separate devices. The encoder 1110 and sender 1130 may operate with live real-time content, in which case the coded media bitstream is typically not stored permanently, but rather buffered for small periods of time in the content encoder 1110 and/or in the sender 1130 to smooth out variations in processing delay, transfer delay, and coded media bitrate.

The sender 1130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the sender 1130 encapsulates the coded media bitstream into packets. For example, when RTP is used, the sender 1130 encapsulates the coded media bitstream into RTP packets according to an RTP payload format. Typically, each media type has a dedicated RTP payload format. It should be again noted that a system may contain more than one sender 1130, but for the sake of simplicity, the following description only considers one sender 1130.

If the media content is encapsulated in a container file for the storage 1120 or for inputting the data to the sender 1130, the sender 1130 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISO Base Media File Format, for encapsulation of the at least one of the contained media bitstream on the communication protocol.

The sender 1130 may or may not be connected to a gateway 1140 through a communication network. The gateway 1140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 1140 include MCUs, gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 1140 is called an RTP mixer or an RTP translator and typically acts as an endpoint of an RTP connection.

The system includes one or more receivers 1150, typically capable of receiving, de-modulating, and de-capsulating the transmitted signal into a coded media bitstream. The coded media bitstream is transferred to a recording storage 1155. The recording storage 1155 may comprise any type of mass memory to store the coded media bitstream. The recording storage 1155 may alternatively or additionally comprise computation memory, such as random access memory. The format of the coded media bitstream in the recording storage 1155 may be an elementary self-contained bitstream format, or one or more coded media bitstreams may be encapsulated into a container file. If there are multiple coded media bitstreams, such as an audio stream and a video stream, associated with each other, a container file is typically used and the receiver 1150 comprises or is attached to a container file generator producing a container file from input streams. Some systems operate "live," i.e. omit the recording storage 1155 and transfer coded media bitstream from the receiver 1150 directly to the decoder 1160. In some systems, only the most recent part of the recorded stream, e.g., the most recent 10-minute excerption of the recorded stream, is maintained in the recording storage 1155, while any earlier recorded data is discarded from the recording storage 1155.

The coded media bitstream is transferred from the recording storage 1155 to the decoder 1160. If there are many coded media bitstreams, such as an audio stream and a video stream, associated with each other and encapsulated into a container file, a file parser (not shown in the figure) is used to decapsulate each coded media bitstream from the container file. The recording storage 1155 or a decoder 1160 may comprise the file parser, or the file parser is attached to either recording storage 1155 or the decoder 1160.

The coded media bitstream may be processed further by a decoder 1160, whose output is one or more uncompressed media streams. Finally, a renderer 1170 may reproduce the uncompressed media streams with a loudspeaker or a display, for example. The receiver 1150, recording storage 1155, decoder 1160, and renderer 1170 may reside in the same physical device or they may be included in separate devices.

Some embodiments related to FIG. 11 are provided next. It needs to be understood that embodiments could be implemented also in other manners in a system like in FIG. 11 or a part thereof. For example, embodiments could be realized only for the encoding side (1110, 1120) or the decoding side (1160, 1170).

In some embodiments, the encoder (1110) may indicate or a bitstream analyzer may identify if all or a subset of the coded pictures are constrained (e.g. that no intra prediction is used in all or a subset of the coded pictures). The subset may for example be all the inter-predicted pictures of the bitstream. If all or a certain subset of the coded pictures are constrained, the file generator may generate the identifier of the above-described embodiment(s) and include the identifier into, for example, in a container file.

In some embodiments, for example as response to user interaction such as zooming, the renderer (1170) or a player (which may comprise or be connected with a file parser and/or the decoder 1160 and/or the renderer 1170) may determine that decoding of a subset, such as a rectangular area within a picture, is desired. The file parser or the decoder (1160) may decode the identifier of the above-described embodiment(s) e.g. from a container file. Based on the identifier, the decoder 1160 or the player may determine that operation according to FIG. 5 or alike may be performed.

In the above, the example embodiments have been described with the help of syntax of the bitstream. It needs to be understood, however, that the corresponding structure and/or computer program may reside at the encoder for generating the bitstream and/or at the decoder for decoding the bitstream. Likewise, where the example embodiments have been described with reference to an encoder, it needs to be understood that the resulting bitstream and the decoder have corresponding elements in them. Likewise, where the example embodiments have been described with reference to a decoder, it needs to be understood that the encoder has structure and/or computer program for generating the bitstream to be decoded by the decoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore in some embodiments of the invention the coder and decoder may share some or all common elements.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

A method according to a first embodiment comprises a method for decoding an encoded video representation from a bitstream, the method comprising
  decoding an identifier indicating that all samples within a scope of the bitstream have been coded with a prediction restriction;
  determining that the scope covers a region of interest within a picture;
  decoding at least a first coding unit preceding said region of interest in decoding order in a parse mode such that syntax elements belonging to said at least first coding unit are parsed, but a sample reconstruction process of said syntax elements is omitted; and
  decoding at least a second coding unit belonging to said region of interest such that syntax elements belonging to said at least second coding unit are parsed and a sample reconstruction process is performed to said syntax elements.

According to an embodiment, said prediction restriction comprises one or more of the following:
  No intra coding has been used for the samples;
  No intra prediction has been used for the samples;
  No in-picture sample prediction has been used for the samples;
  No intra prediction across boundaries of an elementary unit of samples has been used;
  No in-picture sample prediction across boundaries of an elementary unit of samples has been used;
  Only prediction between pictures has been used for the samples.

According to an embodiment, the method further comprises inferring or decoding the scope to be one or more of the following:
  the bitstream;
  inter-predicted pictures of the bitstream;
  at least one scalability layer within the bitstream;
  the picture;
  the region of interest.

According to an embodiment, the method further comprises selecting the first coding unit to be only parsed, and omitting the parsing and decoding of coding units preceding the first coding unit in decoding order.

According to an embodiment, the method further comprises selecting the first coding unit to be decoded in the parse mode on the basis of whether slices, tiles and/or wavefronts have been used in encoding the coding units.

According to an embodiment, when no tiles or wavefronts have been used, the first coding unit to be decoded in the parse mode is selected to be the first coding unit of the slice that immediately precedes, in decoding order, the top-left coding unit of the area that is decoded in a full decoding mode, where coding unit are parsed and subjected to a sample reconstruction process.

According to an embodiment, when wavefronts have been used, the first coding unit to be decoded in the parse mode is selected to be the first coding unit of a CTU row containing the top-left coding unit of the area to be decoded in the full decoding mode.

According to an embodiment, when tiles have been used, the first coding unit to be decoded in the parse mode is selected to be the first coding unit of the tile that immediately precedes, in decoding order, the top-left coding unit of the area that is decoded in the full decoding mode.

According to an embodiment, the method further comprising locating the start of the coded data for a CTU row or a tile from entry points indicated in or along the bitstream.

According to an embodiment, the method further comprising selecting the coding units for which the parsing and the decoding is omitted on the basis of whether slices, tiles and/or wavefronts have been used in encoding the coding units.

According to an embodiment, when no tiles or wavefronts have been used and a slice is not even partially within the area to be decoded in the full decoding mode, the parsing and decoding of the slice may be omitted.

According to an embodiment, when wavefronts have been used and a CTU row is not even partially within the area to be decoded in the full decoding mode, the parsing and decoding of the CTU row may be omitted.

According to an embodiment, when tiles have been used and a tile is not even partially within the area to be decoded in the full decoding mode, the parsing and decoding of the tile may be omitted.

According to an embodiment, the method further comprises performing in the full decoding mode for a complete picture, if a full decoding of a picture is desired.

According to an embodiment, the region of interest that said identifier applies is one of a complete video frame, a slice, a tile, a constituent picture in frame-packed video, or an area indicated in other ways.

According to an embodiment, the identifier indicates that an in-loop filtering process is disabled for the region of interest.

According to an embodiment, the full decoding mode involves a modified decoding process when only a region is decoded which is different than the standard compliant decoding.

According to an embodiment, the method further comprises generating entropy decoding entry point (EDEP) data for at least one point or coding tree unit or coding unit of a coded picture.

According to an embodiment, the method further comprising decoding and using EDEP data similarly to entry points for CTU rows or for tiles to select the first coding unit to be decoded in the parse mode.

An apparatus according to a second embodiment comprises:
 a video decoder configured for decoding a bitstream comprising an encoded video presentation, the video decoder being configured for
 decoding an identifier indicating that all samples within a scope of the bitstream have been coded with a prediction restriction;
 determining that the scope covers a region of interest within a picture;
 decoding at least a first coding unit preceding said region of interest in decoding order in a parse mode such that syntax elements belonging to said at least first coding unit are parsed, but a sample reconstruction process of said syntax elements is omitted; and
 decoding at least a second coding unit belonging to said region of interest such that syntax elements belonging to said at least second coding unit are parsed and a sample reconstruction process is performed to said syntax elements.

According to a third embodiment there is provided a computer readable storage medium stored with code thereon for use by an apparatus, which when executed by a processor, causes the apparatus to perform:
 decoding an identifier indicating that all samples within a scope of the bitstream have been coded with a prediction restriction;
 determining that the scope covers a region of interest within a picture;
 decoding at least a first coding unit preceding said region of interest in decoding order in a parse mode such that syntax elements belonging to said at least first coding unit are parsed, but a sample reconstruction process of said syntax elements is omitted; and
 decoding at least a second coding unit belonging to said region of interest such that syntax elements belonging to said at least second coding unit are parsed and a sample reconstruction process is performed to said syntax elements.

According to a fourth embodiment there is provided at least one processor and at least one memory, said at least one memory stored with code thereon, which when executed by said at least one processor, causes an apparatus to perform:
 decoding an identifier indicating that all samples within a scope of the bitstream have been coded with a prediction restriction;
 determining that the scope covers a region of interest within a picture;
 decoding at least a first coding unit preceding said region of interest in decoding order in a parse mode such that syntax elements belonging to said at least first coding unit are parsed, but a sample reconstruction process of said syntax elements is omitted; and
 decoding at least a second coding unit belonging to said region of interest such that syntax elements belonging to said at least second coding unit are parsed and a sample reconstruction process is performed to said syntax elements.

A method according to a fifth embodiment comprises a method for encoding a video representation, the method comprising
 encoding a first picture;
 encoding at least an area within a second picture with a prediction restriction from the first picture; and
 generating an identifier associated with the second coded picture indicating that said prediction restriction has been used for at least samples of said area within the second picture.

According to an embodiment, said prediction restriction comprises one or more of the following:
 No intra coding has been used for the samples;
 No intra prediction has been used for the samples;
 No in-picture sample prediction has been used for the samples;
 No intra prediction across boundaries of an elementary unit of samples has been used;
 No in-picture sample prediction across boundaries of an elementary unit of samples has been used;
 Only prediction between pictures has been used for the samples.

According to an embodiment, the encoder may include the identifier into and the decoder may decode the identifier from for example one or more of the following:
A supplemental enhancement information (SEI) message
A sequence parameter set (SPS)
A picture parameter set (PPS)
Video usability information (VUI)
A container file format structure.

According to an embodiment, the method further comprising generating entropy decoding entry point (EDEP) data for at least one point or coding tree unit or coding unit of a coded picture.

An apparatus according to a sixth embodiment comprises:
a video encoder configured for encoding a video representation, wherein said video encoder is further configured for encoding a first picture;
encoding at least an area within a second picture using inter coding only from the first picture; and
generating an identifier associated with the second coded picture indicating that only inter prediction has been used for at least said area within the second picture.

According to a seventh embodiment there is provided a computer readable storage medium stored with code thereon for use by an apparatus, which when executed by a processor, causes the apparatus to perform:
encoding a first picture;
encoding at least an area within a second picture with a prediction restriction from the first picture; and
generating an identifier associated with the second coded picture indicating that said prediction restriction has been used for at least samples of said area within the second picture.

According to an eighth embodiment there is provided at least one processor and at least one memory, said at least one memory stored with code thereon, which when executed by said at least one processor, causes an apparatus to perform:
encoding a first picture;
encoding at least an area within a second picture with a prediction restriction from the first picture; and
generating an identifier associated with the second coded picture indicating that said prediction restriction has been used for at least samples of said area within the second picture.

According to a ninth embodiment there is provided a video decoder configured for decoding an encoded video representation, the video decoder being configured for
decoding an identifier indicating that all samples within a scope of the bitstream have been coded with a prediction restriction;
determining that the scope covers a region of interest within a picture;
decoding at least a first coding unit preceding said region of interest in decoding order in a parse mode such that syntax elements belonging to said at least first coding unit are parsed, but a sample reconstruction process of said syntax elements is omitted; and
decoding at least a second coding unit belonging to said region of interest such that syntax elements belonging to said at least second coding unit are parsed and a sample reconstruction process is performed to said syntax elements.

According to a tenth embodiment there is provided a video encoder configured for encoding a video representation, wherein said video encoder is further configured for
encoding a first picture;
encoding at least an area within a second picture with a prediction restriction from the first picture; and
generating an identifier associated with the second coded picture indicating that said prediction restriction has been used for at least samples of said area within the second picture.

The invention claimed is:

1. An apparatus comprising at least one processor and at least one memory including computer program code, the at least one memory and the computer program code configured to, with the at least one processor, cause the apparatus to:
decode an identifier indicating that all samples within a scope of the bitstream have been coded with a prediction restriction;
determine that the scope covers a region of interest within a picture;
decode at least a first coding unit preceding said region of interest in decoding order in a parse mode such that syntax elements belonging to said at least first coding unit are parsed, but a sample reconstruction process of said syntax elements is omitted; and
decode at least a second coding unit belonging to said region of interest such that syntax elements belonging to said at least second coding unit are parsed and a sample reconstruction process is performed to said syntax elements.

2. The apparatus according to claim 1, wherein said prediction restriction comprises one or more of the following:
No intra coding has been used for the samples;
No intra prediction has been used for the samples;
No in-picture sample prediction has been used for the samples;
No intra prediction across boundaries of an elementary unit of samples has been used;
No in-picture sample prediction across boundaries of an elementary unit of samples has been used;
Only prediction between pictures has been used for the samples.

3. The apparatus according to claim 1, the apparatus is further caused to infer or decode the scope to be one or more of the following:
the bitstream;
inter-predicted pictures of the bitstream;
at least one scalability layer within the bitstream;
the picture;
the region of interest.

4. The apparatus according to claim 1, wherein the apparatus is further caused to:
select the first coding unit to be only parsed; and
omit the parsing and decoding of coding units preceding the first coding unit in decoding order.

5. The apparatus according to claim 4, wherein the apparatus is further caused to:
select the first coding unit to be decoded in the parse mode on the basis of whether slices, tiles and/or wavefronts have been used in encoding the coding units.

6. The apparatus according to claim 4, wherein when no tiles or wavefronts have been used, the first coding unit to be decoded in the parse mode is selected to be the first coding unit of the slice that immediately precedes, in decoding order, the top-left coding unit of the area that is decoded in a full decoding mode, where coding unit are parsed and subjected to a sample reconstruction process.

7. The apparatus according to claim 4, wherein when wavefronts have been used, the first coding unit to be decoded in the parse mode is selected to be the first coding unit of a CTU row containing the top-left coding unit of the area to be decoded in a full decoding mode.

8. The apparatus according to claim 4, wherein when tiles have been used, the first coding unit to be decoded in the parse mode is selected to be the first coding unit of the tile that immediately precedes, in decoding order, the top-left coding unit of the area that is decoded in a full decoding mode.

9. The apparatus according to claim 4, wherein the apparatus is further caused to:
select the coding units for which the parsing and the decoding is omitted on the basis of whether slices, tiles and/or wavefronts have been used in encoding the coding units.

10. The apparatus according to claim 1, wherein the apparatus is further caused to:
locate a start of coded data for a CTU row or a tile from entry points indicated in or along the bitstream.

11. The apparatus according to claim 10, wherein when no tiles or wavefronts have been used and a slice is not even partially within the area to be decoded in the full decoding mode, the parsing and decoding of the slice may be omitted.

12. The apparatus according to claim 10, wherein when wavefronts have been used and a CTU row is not even partially within the area to be decoded in the full decoding mode, the parsing and decoding of the CTU row may be omitted.

13. The apparatus according to claim 10, wherein when tiles have been used and a tile is not even partially within the area to be decoded in the full decoding mode, the parsing and decoding of the tile may be omitted.

14. The apparatus according to claim 1, wherein the apparatus is further caused to:
perform in a full decoding mode for a complete picture, if a full decoding of a picture is desired.

15. The apparatus according to claim 1, wherein the region of interest that said identifier applies is one of a complete video frame, a slice, a tile, a constituent picture in frame-packed video, or an area indicated in other ways.

16. The apparatus according to claim 1, wherein the identifier indicates that an in-loop filtering process is disabled for the region of interest.

17. The apparatus according to claim 1, wherein the full decoding mode involves a modified decoding process when only a region is decoded which is different than the standard compliant decoding.

18. The apparatus according to claim 1, wherein the apparatus is further caused to:
generate entropy decoding entry point (EDEP) data for at least one point or coding tree unit or coding unit of a coded picture; and
decode and use EDEP data similarly to entry points for CTU rows or for tiles to select the first coding unit to be decoded in the parse mode.

19. A method for decoding an encoded video representation from a bitstream, the method comprising:
decoding an identifier indicating that all samples within a scope of the bitstream have been coded with a prediction restriction;
determining that the scope covers a region of interest within a picture;
decoding at least a first coding unit preceding said region of interest in decoding order in a parse mode such that syntax elements belonging to said at least first coding unit are parsed, but a sample reconstruction process of said syntax elements is omitted; and
decoding at least a second coding unit belonging to said region of interest such that syntax elements belonging to said at least second coding unit are parsed and a sample reconstruction process is performed to said syntax elements.

* * * * *

UNITED STATES PATENT AND TRADEMARK OFFICE
CERTIFICATE OF CORRECTION

PATENT NO. : 10,154,274 B2
APPLICATION NO. : 14/904791
DATED : December 11, 2018
INVENTOR(S) : Lainema et al.

It is certified that error appears in the above-identified patent and that said Letters Patent is hereby corrected as shown below:

On the Title Page

Item (54), and in the Specification Column 1, Lines 1-3:
"APPARATUS, A METHOD AND A COMPUTER PROGRAM FOR VIDEO CODING AND DECODING" should read --AN APPARATUS, A METHOD AND A COMPUTER PROGRAM FOR VIDEO CODING AND DECODING--.

Signed and Sealed this
Nineteenth Day of November, 2019

Andrei Iancu
*Director of the United States Patent and Trademark Office*